(12) United States Patent
Won et al.

(10) Patent No.: US 10,331,325 B2
(45) Date of Patent: Jun. 25, 2019

(54) MOBILE DEVICE HAVING PARALLAX SCROLLING FUNCTION AND METHOD FOR CONTROLLING THE SAME

(71) Applicant: Samsung Electronics Co., Ltd., Suwon-si, Gyeonggi-do (KR)

(72) Inventors: Sung-Joon Won, Seongnam-si (KR); Masato Watanabe, Seoul (KR); Jong-Sung Joo, Seoul (KR); Joong-Hun Kwon, Seoul (KR); Ji-Eun Yang, Seoul (KR); Chang-Mo Yang, Ansan-si (KR); Hui-Chul Yang, Yongin-si (KR); Jae-Myoung Lee, Seoul (KR); Chul-Ho Jang, Seoul (KR); Yun Jegal, Seoul (KR); In-Won Jong, Seoul (KR); Hyung-Joo Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 549 days.

(21) Appl. No.: 14/075,529

(22) Filed: Nov. 8, 2013

(65) Prior Publication Data

US 2014/0137032 A1    May 15, 2014

(30) Foreign Application Priority Data

Nov. 12, 2012    (KR) .......................... 10-2012-0127655

(51) Int. Cl.
*G06F 3/0488* (2013.01)
*G06F 3/0485* (2013.01)
*G06F 3/0482* (2013.01)

(52) U.S. Cl.
CPC .......... *G06F 3/0485* (2013.01); *G06F 3/0488* (2013.01); *G06F 3/0482* (2013.01)

(58) Field of Classification Search
CPC .... G06F 3/0482; G06F 3/0485; G06F 3/0488; G06T 15/20; G06T 13/80
USPC .................. 715/784, 863; 315/173, 419, 684
See application file for complete search history.

(56) References Cited

U.S. PATENT DOCUMENTS

| | | | | |
|---|---|---|---|---|
| 6,078,306 A | * | 6/2000 | Lewis ...................... | G09G 5/14 345/685 |
| 2007/0146360 A1 | | 6/2007 | Clatworthy et al. | |
| 2010/0083165 A1 | * | 4/2010 | Andrews ............... | G06F 1/1626 715/784 |
| 2010/0309147 A1 | | 12/2010 | Fleizach et al. | |

(Continued)

FOREIGN PATENT DOCUMENTS

| | | |
|---|---|---|
| CN | 102156555 A | 8/2011 |
| CN | 102368195 A | 3/2012 |

(Continued)

OTHER PUBLICATIONS

Korean Office Action dated Feb. 28, 2019, issue in Korean Patent Application No. 10-2012-0127655.

*Primary Examiner* — Rinna Yi
(74) *Attorney, Agent, or Firm* — Jefferson IP Law, LLP

(57) ABSTRACT

A mobile device having a parallax scrolling function and a method for controlling the mobile device are provided. The method includes displaying a plurality of objects on a touch screen of the mobile device, detecting a touch for scrolling the plurality of objects on the touch screen, and sequentially scrolling the plurality of objects at different time intervals according to attributes of the plurality of objects.

21 Claims, 27 Drawing Sheets

(56) References Cited

U.S. PATENT DOCUMENTS

| | | | |
|---|---|---|---|
| 2012/0019513 A1 | 1/2012 | Fong et al. | |
| 2012/0056889 A1 | 3/2012 | Carter et al. | |
| 2012/0127158 A1 | 5/2012 | Miyagi et al. | |
| 2012/0188243 A1* | 7/2012 | Fujii et al. | 345/426 |
| 2012/0317513 A1* | 12/2012 | Mochizuki | G06F 3/04883 715/830 |
| 2012/0327009 A1* | 12/2012 | Fleizach | 345/173 |
| 2013/0036386 A1* | 2/2013 | Park et al. | 715/831 |
| 2013/0055150 A1* | 2/2013 | Galor | 715/784 |
| 2013/0093795 A1* | 4/2013 | Miyazaki | G06F 3/0485 345/684 |
| 2013/0179830 A1 | 7/2013 | Lee et al. | |

FOREIGN PATENT DOCUMENTS

| | | |
|---|---|---|
| CN | 102541450 A | 7/2012 |
| CN | 102760026 A | 10/2012 |
| CN | 103226428 A | 7/2013 |
| EP | 2 261 784 A1 | 12/2010 |
| EP | 2 378 406 A2 | 10/2011 |
| EP | 2 480 957 A1 | 8/2012 |
| KR | 10-2013-0015291 A | 2/2013 |
| WO | 2011/037558 A1 | 3/2011 |

\* cited by examiner

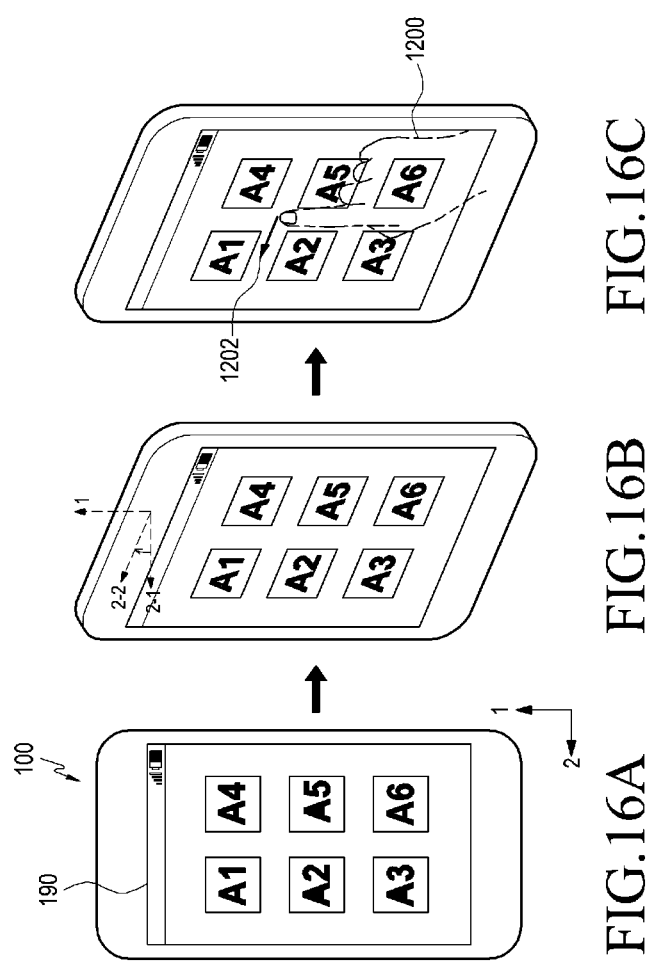

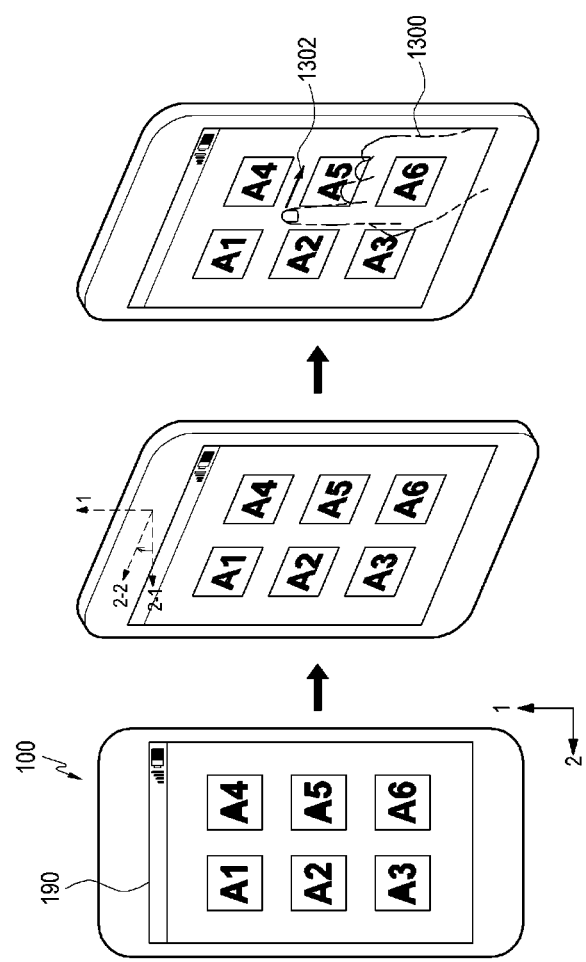

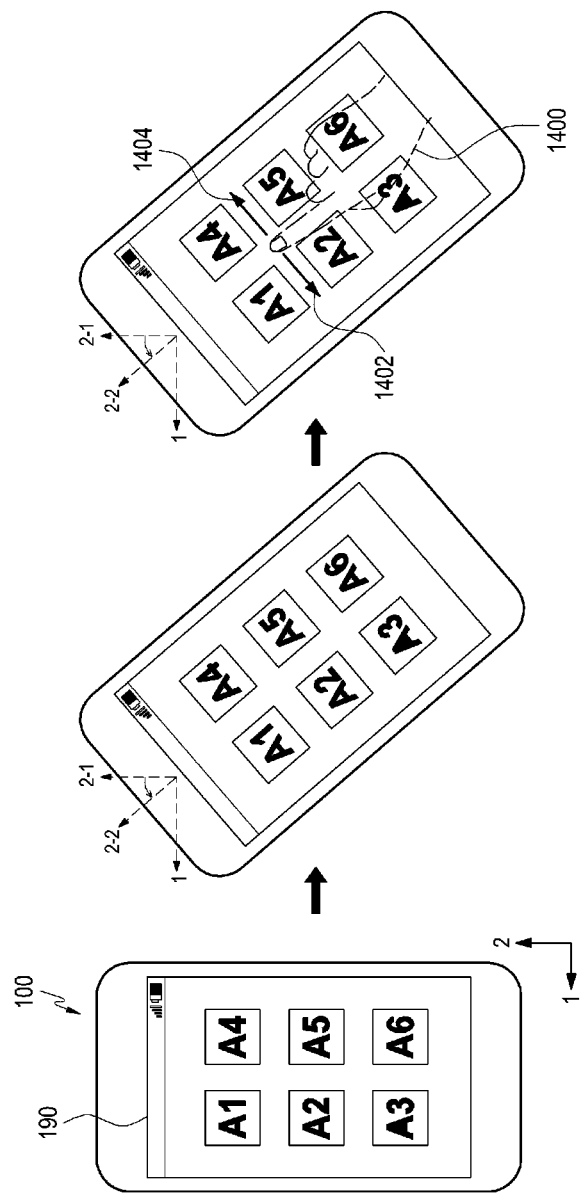

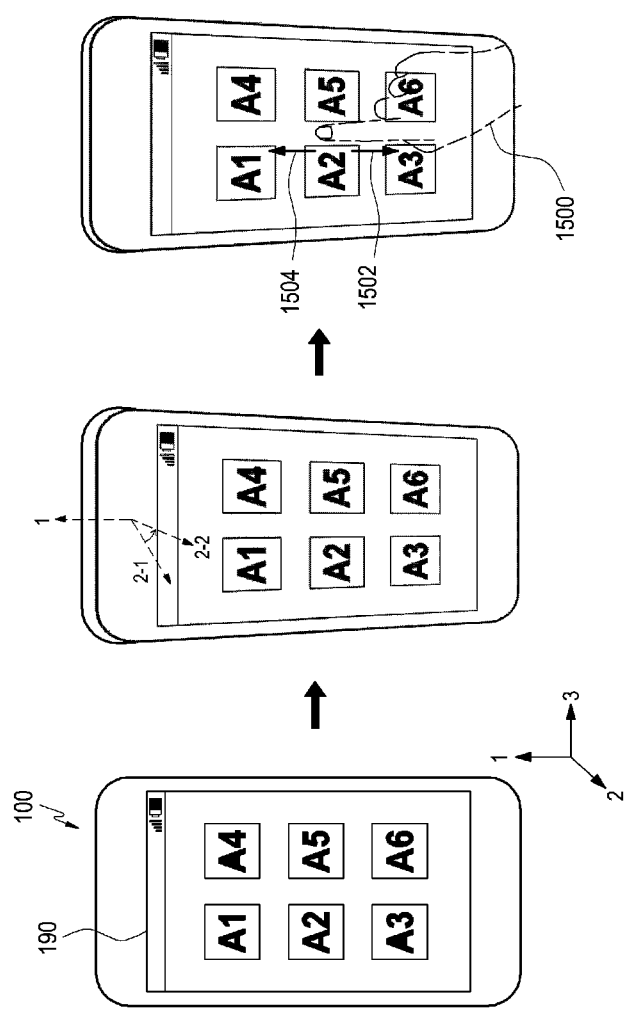

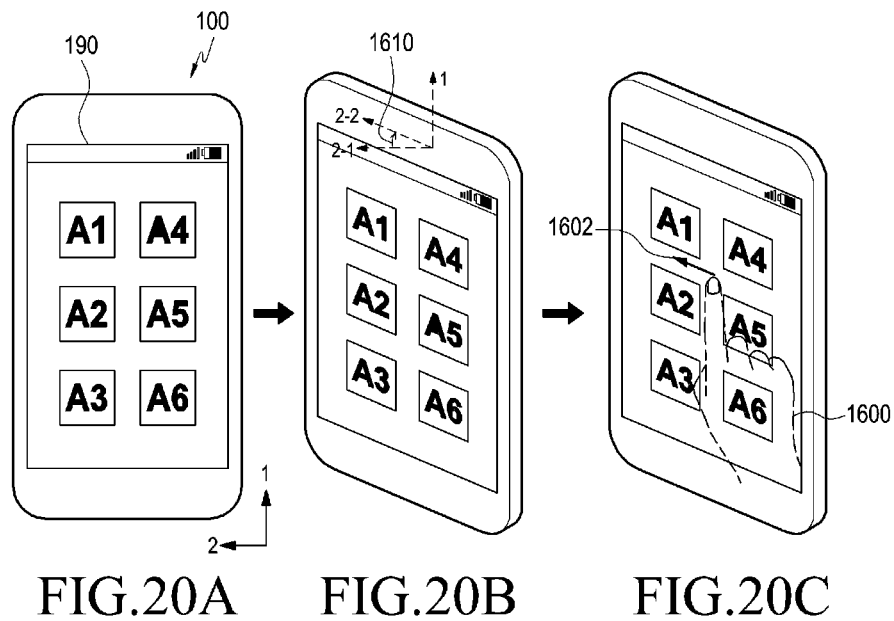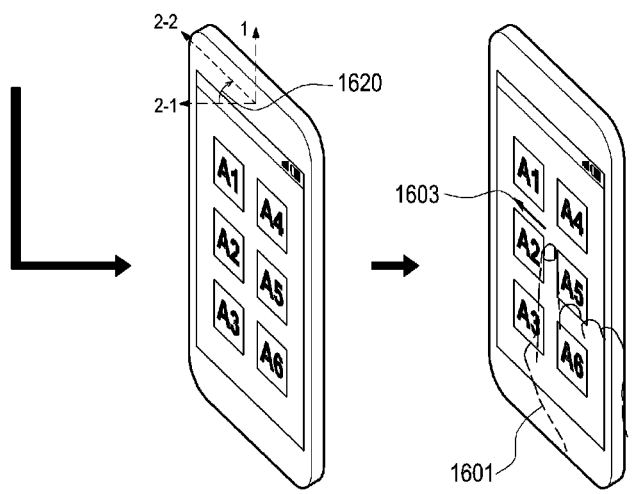
FIG.20A  FIG.20B  FIG.20C
FIG.20D  FIG.20E

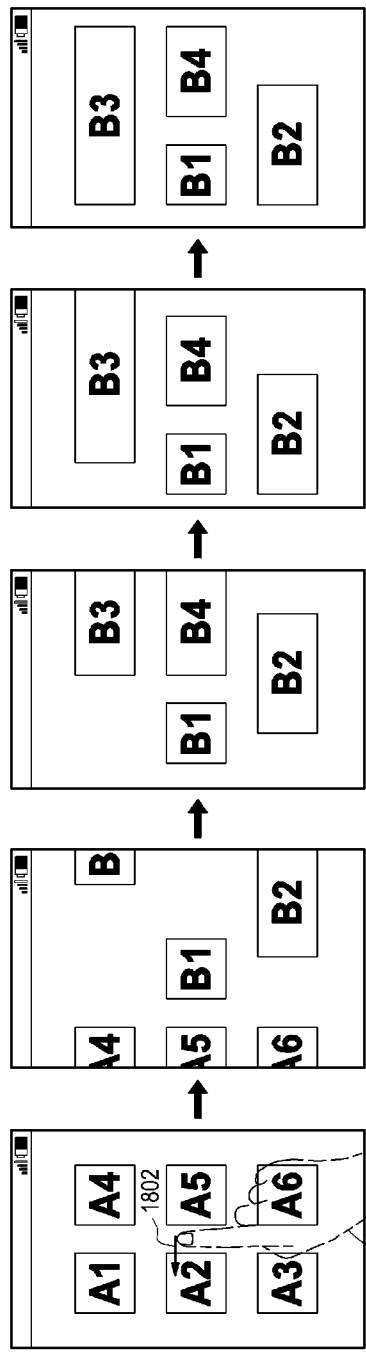

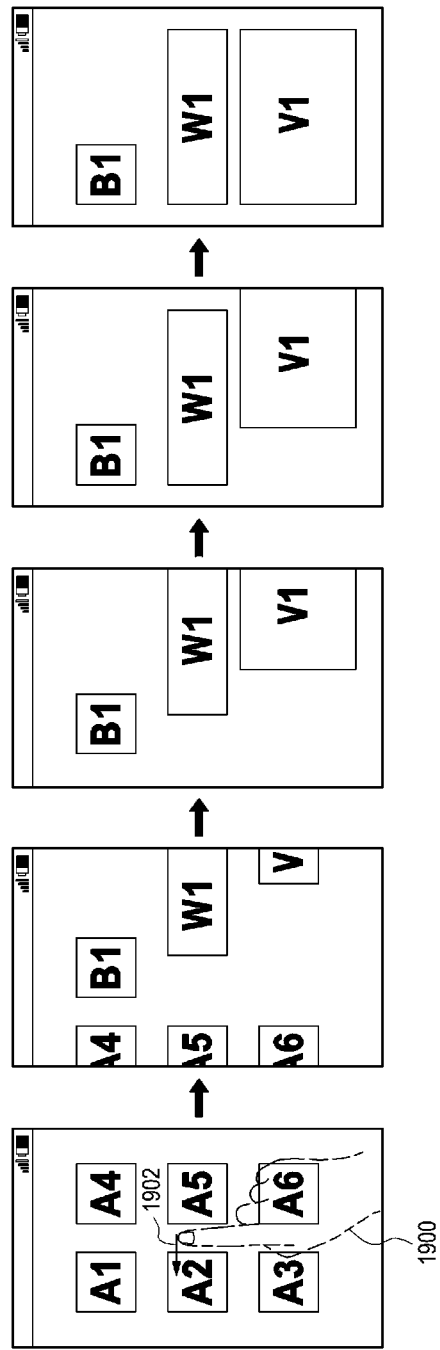

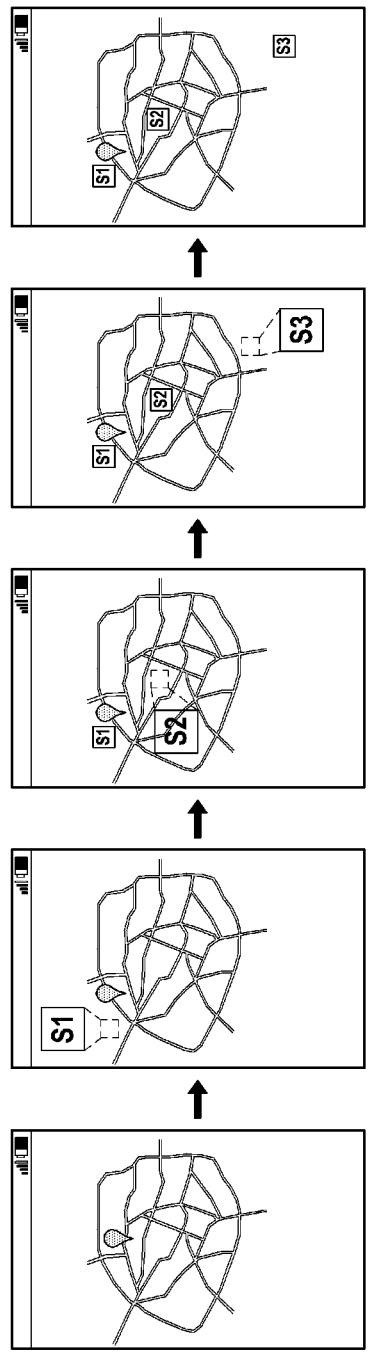

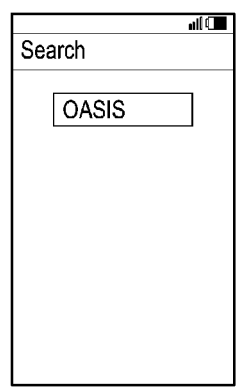 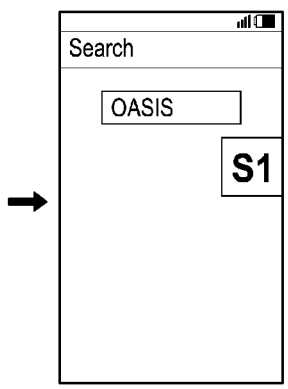 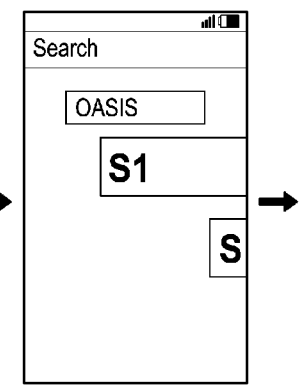
FIG.26A     FIG.26B     FIG.26C
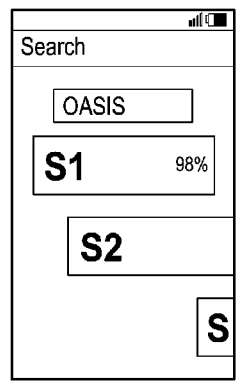 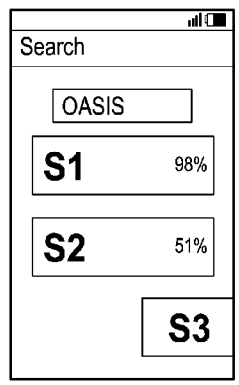 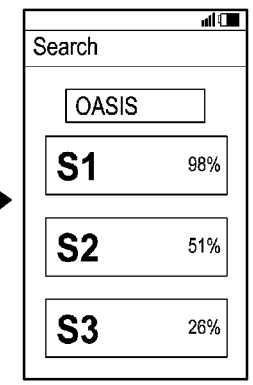
FIG.26D     FIG.26E     FIG.26F

MOBILE DEVICE HAVING PARALLAX SCROLLING FUNCTION AND METHOD FOR CONTROLLING THE SAME

PRIORITY

This application claims the benefit under 35 U.S.C. § 119(a) of a Korean patent application filed on Nov. 12, 2012 in the Korean Intellectual Property Office and assigned Ser. No. 10-2012-0127655, the entire disclosure of which is hereby incorporated by reference.

BACKGROUND OF THE INVENTION

1. Field of the Invention

The present invention relates to a mobile device and a method for controlling the same. More particularly, the present invention relates to a mobile device having a parallax scrolling function to provide an effective User Interface (UI) and a method for controlling the same.

2. Description of the Related Art

Various objects are displayed on the screens of recently developed mobile devices. For example, icons may be displayed on the screen of a mobile device. Upon detection of a user's selection of an object, such as an icon, the mobile device provides a function corresponding to the selected icon to the user.

With advances in technology, the screen of a mobile device can be configured as a touch screen. Thus, the mobile device provides various UIs in response to a user's touch inputs on the touch screen.

As an example of such a UI, a scrolling function can be implemented using the touch screen in the mobile device. That is, the screen of the touch screen can be scrolled according to a user touch. For example, when the user touches the screen and drags the touch to the left, the screen of the touch screen may be scrolled to the left in the mobile device.

However, the scrolling function is confined to scrolling the screen of the touch screen in response to a detected user's touch, without providing other functions. Therefore, a need exists for a technique that provides various UIs by detecting user touches.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a mobile device having a parallax scrolling function of sequentially scrolling a plurality of objects at different time intervals according to the attributes of the objects, and a method for controlling the same.

Another aspect of the present invention is to provide a mobile device having a parallax scrolling function of sequentially scrolling a plurality of objects at different time intervals in order of proximity to the position of a detected touch, and a method for controlling the same.

Another aspect of the present invention is to provide a mobile device having a parallax scrolling function of sequentially scrolling a plurality of objects at different time intervals according to the inclined direction and inclination degree of the mobile device detected by a sensor module, and a method for controlling the same.

Another aspect of the present invention is to provide a mobile device having a parallax scrolling function of sequentially scrolling a plurality of objects at different time intervals according to the sizes of the objects, and a method for controlling the same.

A further aspect of the present invention is to provide a mobile device having a parallax scrolling function of sequentially scrolling a plurality of objects at different time intervals according to at least one of the positions of the objects on a touch screen, the distances of the objects to the position of a detected touch, and the sizes, time information, on-map position information, search accuracy information, use frequencies, colors, or shapes of the objects, and a method for controlling the same.

In accordance with an aspect the present invention, a method for controlling a mobile device having a parallax scrolling function is provided. The method includes displaying a plurality of objects on a touch screen of the mobile device, detecting a touch for scrolling the plurality of objects on the touch screen, and sequentially scrolling the plurality of objects at different time intervals according to attributes of the plurality of objects.

In accordance with another aspect the present invention, a mobile device having a parallax scrolling function is provided. The mobile device includes a touch screen configured to display a plurality of objects, and a controller configured to detect a touch for scrolling the plurality of objects on the touch screen and to scroll the plurality of objects sequentially at different time intervals according to attributes of the plurality of objects.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which:

FIGS. 9A to 14E illustrate parallax scrolling functions of sequentially scrolling a plurality of objects at different time intervals in order of proximity to the position of a detected touch according to an exemplary embodiment of the present invention;

FIGS. 16A to 20E illustrate parallax scrolling functions of sequentially scrolling a plurality of objects at different time intervals based on the inclined direction and inclination angle of a mobile device according to an exemplary embodiment of the present invention;

FIGS. 22A to 22E and FIGS. 23A to 23E illustrate parallax scrolling functions of sequentially scrolling a plurality of objects at different time intervals based on the sizes of the objects according to an exemplary embodiment of the present invention;

FIGS. 25A to 25E illustrate parallax scrolling functions of sequentially scrolling a plurality of objects at different time intervals based on the on-map positions of the objects according to an exemplary embodiment of the present invention;

FIGS. 26A to 26F illustrate parallax scrolling functions of sequentially scrolling a plurality of objects at different time intervals based on search accuracy information about the objects according to an exemplary embodiment of the present invention.

Throughout the drawings, it should be noted that like reference numbers are used to depict the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While ordinal numbers like first, second, etc. may be used to describe a number of components, these components are not limited by the terms. Rather, the terms are merely used to distinguish one component from other components. For example, a first component may be referred to as a second component or vice versa within the scope and spirit of the present invention. The term 'and/or' means inclusion of a combination of a plurality of described associated items or one of the items.

The technical terms used in the present disclosure are provided simply to describe exemplary embodiments and are not intended to restrict the present invention. Herein, singular expressions include plural expressions unless otherwise clarified in the context. In this description, the term 'include' or 'have' is not interpreted as necessarily including all of the features, numbers, steps, operations, components, parts, or a combination thereof described in the specification. Rather, it should be understood that there are possibilities of omitting or adding one or more features, numbers, steps, operations, components, parts, or combinations thereof.

Unless otherwise defined, all the terms used herein including technical or scientific terms have the same meanings as terms generally understood by those skilled in the art. In addition, terms defined in a general dictionary should be understood so as to have the same meanings as contextual meanings of the related art. Unless definitely defined in the present invention, the terms are not interpreted as ideal or excessively formal meanings.

Figure 1:
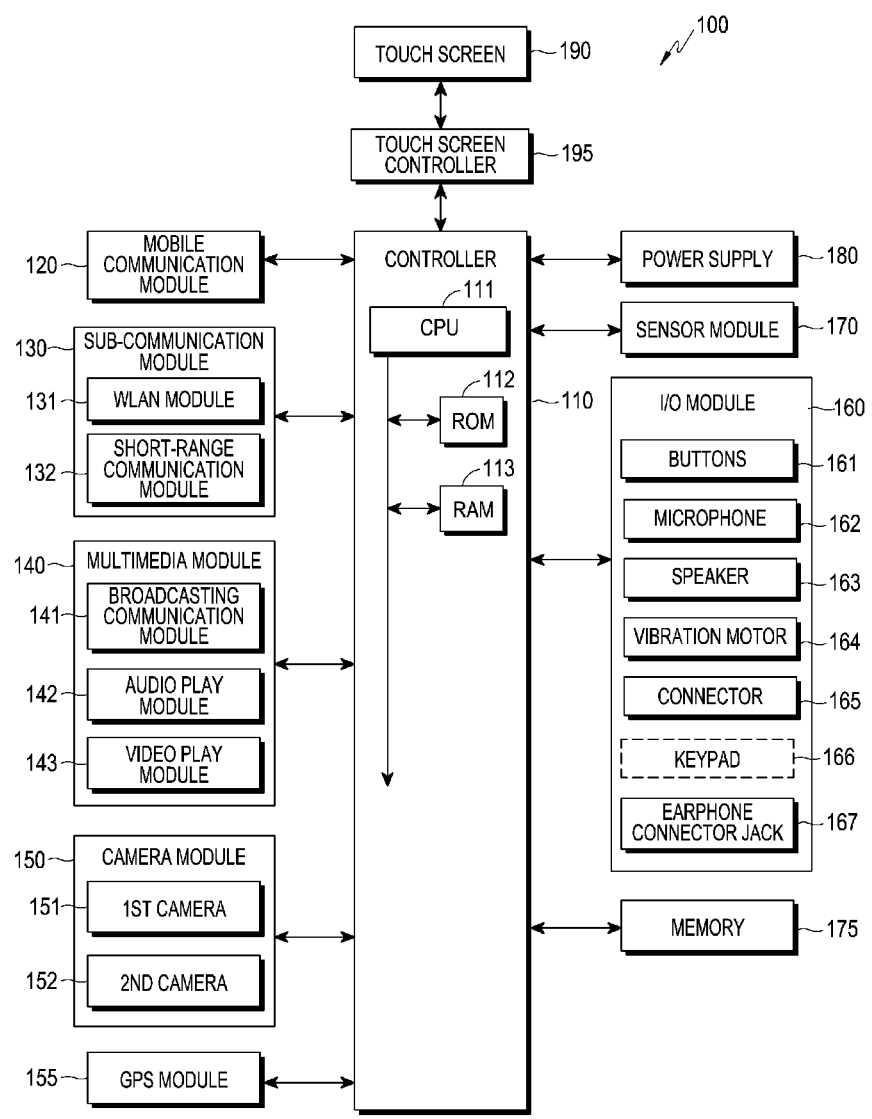
FIG. 1 is a block diagram of a mobile device according to an exemplary embodiment of the present invention.

FIG. 1 is a block diagram of a mobile device according to an exemplary embodiment of the present invention.

Referring to FIG. 1, a mobile device 100 may be connected to an external device (not shown) through an external device interface such as a sub-communication module 130, a connector 165, and an earphone connector jack 167. The term 'external device' covers a variety of devices that can be detachably connected to the mobile device 100 by wire, such as an earphone, an external speaker, a Universal Serial Bus (USB) memory, a charger, a cradle, a docking station, a Digital Multimedia Broadcasting (DMB) antenna, a mobile payment device, a health care device (e.g., a blood sugar meter, etc.), a game console, a vehicle navigator, etc. The 'external device' may include a Bluetooth communication device wirelessly connectable to the mobile device 100 by short-range communication, a Near Field Communication (NFC) device, a Wireless Fidelity (WiFi) Direct communication device, a wireless Access Point (AP), and the like. In addition, the external device may be any of another mobile device, a portable phone, a smart phone, a tablet PC, a desktop PC, a server, and the like.

The mobile device 100 includes a display 190 and a display controller 195. The mobile device 100 further includes a controller 110, a mobile communication module 120, the sub-communication module 130, a multimedia module 140, a camera module 150, a Global Positioning System (GPS) module 155, an Input/Output (I/O) module 160, a sensor module 170, a memory 175, and a power supply 180. The sub-communication module 130 includes at least one of a Wireless Local Area Network (WLAN) module 131 and a short-range communication module 132, and the multimedia module 140 includes at least one of a broadcasting communication module 141, an audio play module 142, and a video play module 143. The camera module 150 includes at least one of a first camera 151 and a second camera 152, and the I/O module 160 includes at least one of buttons 161, a microphone 162, a speaker 163, a vibration motor 164, the connector 165, a keypad 166, and the earphone connector jack 167. The following description is made with the appreciation that the display 190 and the display controller 195 are a touch screen and a touch screen controller, respectively, by way of example.

The controller 110 may include a Central Processing Unit (CPU) 111, a Read Only Memory (ROM) 112 for storing a control program to control the mobile device 100, and a Random Access Memory (RAM) 113 for storing signals or data received from the outside of the mobile device 100 or for use as a memory space for an operation performed by the mobile device 100. The CPU 111 may include a single core, dual cores, triple cores, or quad cores. The CPU 111, the ROM 112, and the RAM 113 may be connected to one another through an internal bus.

The controller 110 may control the mobile communication module 120, the sub-communication module 130, the multimedia module 140, the camera module 150, the GPS module 155, the I/O module 160, the sensor module 170, the memory 175, the power supply 180, the touch screen 190, and the touch screen controller 195.

The mobile communication module 120 connects the mobile device 100 to an external device through one or more antennas (not shown) by mobile communication under the control of the controller 110. The mobile communication module 120 transmits wireless signals to or receives wireless signals from a portable phone (not shown), a smart phone (not shown), a tablet PC (not shown), or another mobile device (not shown) that has a phone number input to the mobile device 100, for voice call, video call, Short Message Service (SMS), or Multimedia Messaging Service (MMS).

The sub-communication module 130 may include at least one of the WLAN module 131 and the short-range communication module 132. For example, the sub-communication module 130 may include the WLAN module 131 or the short-range communication module 132 alone or both.

The WLAN module 131 may be connected to the Internet under the control of the controller 110 in a place where a wireless AP (not shown) is installed. The WLAN module 131 supports the WLAN standard IEEE802.11x of the Institute of Electrical and Electronics Engineers (IEEE). The short-range communication module 132 may conduct short-range wireless communication between the mobile device 100 and an image forming device (not shown) under the control of the controller 110. The short-range communication may conform to Bluetooth, Infrared Data Association (IrDA), WiFi Direct, NFC, etc.

The mobile device 100 may include at least one of the mobile communication module 120, the WLAN module 131, and the short-range communication module 132 according to its capabilities. For example, the mobile device 100 may include a combination of the mobile communication module 120, the WLAN module 131, and the short-range communication module 132 according to its capabilities.

The multimedia module 140 may include the broadcasting communication module 141, the audio play module 142, or the video play module 143. The broadcasting communication module 141 may receive a broadcast signal (for example, a TV broadcast signal, a radio broadcast signal, or a data broadcast signal) and additional broadcasting information (for example, an Electronic Program Guide (EPG) or Electronic Service Guide (ESG)) from a broadcasting station through a broadcasting communication antenna (not shown) under the control of the controller 110. The audio play module 142 may open a stored or received digital audio file (for example, a file having such an extension as mp3, wma, ogg, or way) under the control of the controller 110. The video play module 143 may open a stored or received digital video file (for example, a file having an extension such as mpeg, mpg, mp4, avi, mov, or mkv) under the control of the controller 110. The video play module 143 may also open a digital audio file.

The multimedia module 140 may include the audio play module 142 and the video play module 143 without the broadcasting communication module 141. Or the audio play module 142 or the video play module 143 of the multimedia module 140 may be incorporated into the controller 110.

The camera module 150 may include at least one of the first camera 151 and the second camera 152, for capturing a still image or a video under the control of the controller 110. Further, the first camera 151 or the second camera 152 may include an auxiliary light source (for example, a flash (not shown)) for providing a light intensity required for capturing an image. The first camera 151 may be disposed on the front surface of the mobile device 100, while the second camera 152 may be disposed on the rear surface of the device 100. Or the first camera 151 and the second camera 152 may be arranged near to each other (for example, the distance between the first camera 151 and the second camera 152 is between 1 cm and 8 cm) in order to capture a three-dimensional still image or video.

The GPS module 155 may receive radio waves from a plurality of GPS satellites (not shown) in Earth orbit and calculate a position of the mobile device 100 based on the Time of Arrival (ToA) of satellite signals from the GPS satellites to the mobile device 100.

The I/O module 160 may include at least one of a plurality of buttons 161, the microphone 162, the speaker 163, the vibration motor 164, the connector 165, and the keypad 166.

The buttons 161 may be formed on the front surface, a side surface, or the rear surface of a housing of the mobile device 100, and may include at least one of a power/lock button, a volume button, a menu button, a home button, a back button, a search button, and the like.

The microphone 162 receives a voice or sound and converts the received voice or sound to an electrical signal under the control of the controller 110.

The speaker 163 may output sounds corresponding to various signals (for example, a wireless signal, a broadcast signal, a digital audio file, a digital video file, a photo shot, etc.) received from the mobile communication module 120, the sub-communication module 130, the multimedia module 140, and the camera module 150 to the outside of the mobile device 100. The speaker 163 may output sounds corresponding to functions (for example, a button manipulation sound or a ringback tone for a call) performed by the mobile device 100. One or more speakers 163 may be disposed at an appropriate position or positions of the housing.

The vibration motor 164 may convert an electrical signal to a mechanical vibration under the control of the controller 110. For example, when the mobile device 100 receives an incoming voice call from another mobile device (not shown) in vibration mode, the vibration motor 164 operates. One or more vibration motors 164 may be mounted inside the housing of the mobile device 100. The vibration motor 164 may operate in response to a user's touch on the touch screen 190 and a continuous movement of the touch on the touch screen 190.

The connector 165 may be used as an interface for connecting the mobile device 100 to an external device (not shown) or a power source (not shown). The connector 165 may transmit data stored in the memory 175 to the external device via a cable connected to the connector 165 or may receive data from the external device via the cable, under the control of the controller 110. The external device may be a docking station and the data may be a signal received from an external input device, for example, a mouse or a keyboard. The mobile device 100 may receive power or charge a battery (not shown) from the power source via the cable connected to the connector 165.

The keypad 166 may receive a key input from the user to control the mobile device 100. The keypad 166 includes a physical keypad (not shown) formed in the mobile device 100 or a virtual keypad (not shown) displayed on the touch screen 190. The physical keypad may not be provided according to the capabilities or configuration of the mobile device 100.

An earphone (not shown) may be connected to the mobile device 100 by being inserted into the earphone connector jack 167.

The sensor module 170 includes at least one sensor for detecting a state of the mobile device 100. For example, the sensor module 170 may include a proximity sensor for detecting whether the user is close to the mobile device 100, an illumination sensor (not shown) for detecting the amount of ambient light around the mobile device 100, a motion sensor (not shown) for detecting a motion of the mobile device 100 (for example, rotation, acceleration or vibration of the mobile device 100), a geomagnetic sensor (not shown) for detecting a point of the compass using the earth's magnetic field, a gravity sensor (not shown) for detecting the direction of gravity, and an altimeter (not shown) for detecting the local altitude by measuring the air pressure. At least one sensor may detect a state of the mobile device 100, generate a signal corresponding to the detected state, and transmit the generated signal to the controller 110. A sensor may be added to or removed from the sensor module 170 according to the capabilities of the mobile device 100.

The memory 175 may store input/output signals or data in accordance with operations of the mobile communication module 120, the sub-communication module 130, the multimedia module 140, the camera module 150, the GPS module 155, the I/O module 160, the sensor module 170, and the touch screen 190 under the control of the controller 110. The memory 175 may store a control program for controlling the mobile device 100 or the controller 110, and applications.

The term "memory" covers the memory 175, the ROM 112 and the RAM 113 within the controller 110, or a memory card (not shown) (e.g., a Secure Digital (SD) card, a memory stick, etc.) mounted to the mobile device 100. The memory may include a non-volatile memory, a volatile memory, a Hard Disk Drive (HDD), a Solid State Drive (SSD, etc.).

The power supply 180 may supply power to one or more batteries (not shown) mounted in the housing of the mobile device 100 under the control of the controller 110. The one or more batteries supply power to the mobile device 100. Further, the power supply 180 may supply power received from an external power source (not shown) via the cable connected to the connector 165 to the mobile device 100. The power supply 180 may also supply power received wirelessly from the external power source to the mobile device 100 by a wireless charging technology.

The touch screen 190 may provide User Interfaces (UIs) corresponding to various services (for example, call, data transmission, broadcasting, photo taking, etc.) to the user. The touch screen 190 may transmit an analog signal corresponding to at least one touch on a UI to the touch screen controller 195. The touch screen 190 may receive at least one touch input through a user's body part (e.g., a finger) or a touch input tool (for example, a stylus pen). Also, the touch screen 190 may receive a touch input signal corresponding to a continuous movement of a touch among one or more touches. The touch screen 190 may transmit an analog signal corresponding to the continuous movement of the input touch to the touch screen controller 195.

In exemplary embodiments of the present invention, the term 'touch' may include a contact touch and a non-contact touch. That is, the term 'touch' is not limited to contacts between the touch screen 190 and the user's body part or the touch input tool. A gap detectable to the touch screen 190 may vary according to the capabilities or configuration of the mobile device 100.

The touch screen 190 may be implemented by, for example, a resistive type, a capacitive type, an infrared type, or an acoustic wave type.

The touch screen controller 195 converts an analog signal received from the touch screen 190 to a digital signal (for example, X and Y coordinates). The controller 110 may control the touch screen 190 using the digital signal received from the touch screen controller 195. For example, the controller 110 may control selection or execution of a shortcut icon (not shown) displayed on the touch screen 190 in response to a touch. The touch screen controller 195 may be incorporated into the controller 110.

Figure 2:
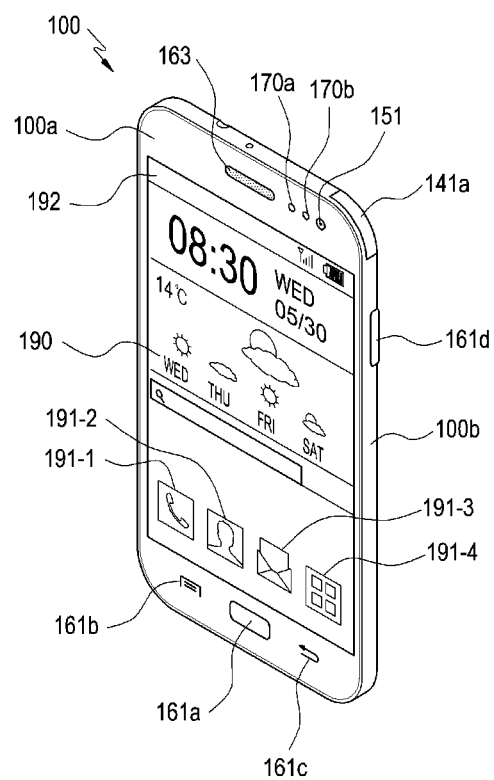
FIG. 2 is a front perspective view of a mobile device according to an exemplary embodiment of the present invention.
Figure 3:
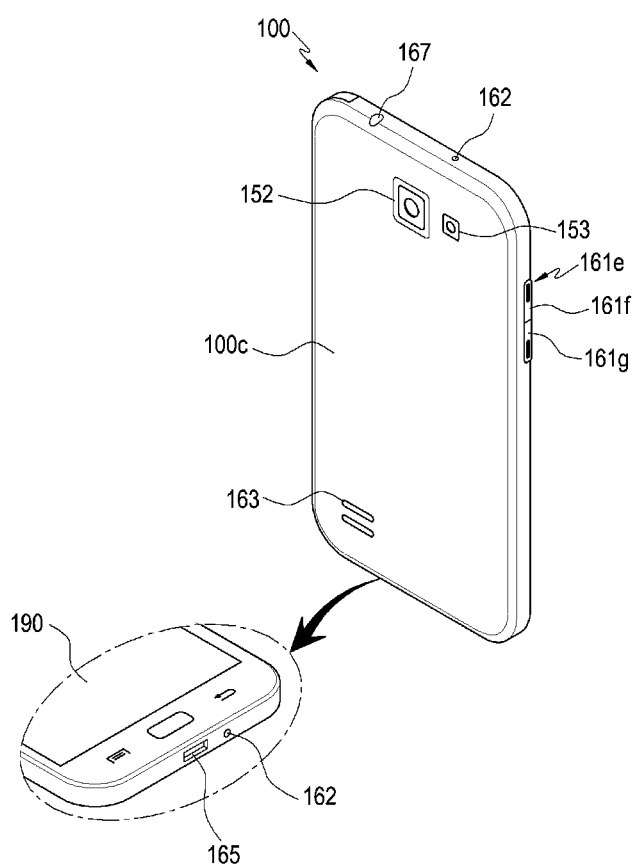
FIG. 3 is a rear perspective view of a mobile device according to an exemplary embodiment of the present invention.

FIGS. 2 and 3 are front and rear perspective views of a mobile device respectively according to an exemplary embodiment of the present invention.

Referring to FIG. 2, the touch screen 190 is disposed at the center of the front surface 100*a* of the mobile device 100, occupying almost the entirety of the front surface 100*a*. In FIG. 2, a main home screen is displayed on the touch screen 190, by way of example. The main home screen is the first screen to be displayed on the touch screen 190, when the mobile device 100 is powered on. In the case where the mobile device 100 has different home screens of a plurality of pages, the main home screen may be the first of the home screens of the plurality of pages. Shortcut icons 191-1, 191-2 and 191-3 for executing frequently used applications, an application switch key 191-4, time, weather, etc. may be displayed on the home screen. The application switch key 191-4 is used to display application icons representing applications on the touch screen 190. A status bar 192 may be displayed at the top of the touch screen 190 in order to indicate states of the mobile device 100 such as a battery charged state, a received signal strength, and a current time.

A home button 161*a*, a menu button 161*b*, and a back button 161*c* may be formed at the bottom of the touch screen 190.

The home button 161*a* is used to display the main home screen on the touch screen 190. For example, upon pressing (or touching) of the home button 161*a* while any home screen other than the main home screen or a menu screen is displayed on the touch screen 190, the main home screen may be displayed on the touch screen 190. Upon pressing (or touching) of the home button 161*a* during execution of applications on the home screen 190, the main home screen illustrated in FIG. 2 may be displayed on the touch screen 190. The home button 161*a* may also be used to display recently used applications or a task manager on the touch screen 190.

The menu button 161*b* provides link menus available on the touch screen 190. The link menus may include a widget adding menu, a background changing menu, a search menu, an edit menu, an environment setting menu, etc. During execution of an application, the menu button 161b may provide a link menu linked to the application.

The back button 161c may display the screen previous to a current screen or end the latest used application.

The first camera 151, an illumination sensor 170a, and a proximity sensor 170b may be arranged at a corner of the front surface 100a of the mobile device 100, whereas the second camera 152, a flash 153, and the speaker 163 may be arranged on the rear surface 100c of the mobile device 100. Notably, the speaker 163 may also be arranged on the front surface 100a of the mobile device 100.

A power/reset button 161d, a volume button 161e, including a volume up button 161f and a volume down button 161g, a terrestrial DMB antenna 141a for receiving a broadcast signal, and one or more microphones 162 may be disposed on side surfaces 100b of the mobile device 100. The DMB antenna 141a may be mounted to the mobile device 100 fixedly or detachably.

The connector 165 is formed on the bottom side surface of the mobile device 100. The connector 165 includes a plurality of electrodes and may be connected to an external device by wire. The earphone connector jack 167 may be formed on the top side surface of the mobile device 100, for allowing an earphone to be inserted.

Figure 4:
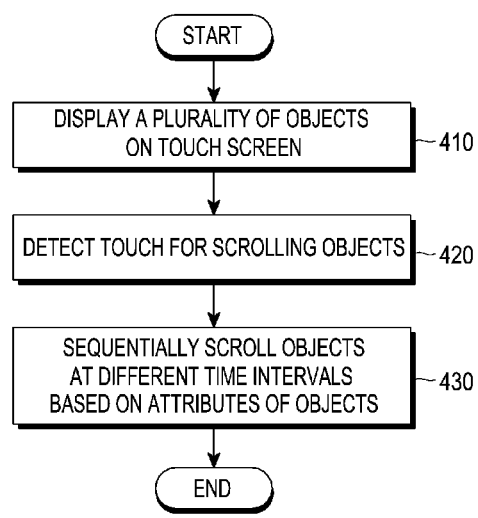
FIG. 4 is a flowchart illustrating a method for controlling a mobile device having a parallax scrolling function according to an exemplary embodiment of the present invention.

FIG. 4 is a flowchart illustrating a method for controlling a mobile device having a parallax scrolling function according to an exemplary embodiment of the present invention.

Referring to FIG. 4, a plurality of objects are displayed on the touch screen of the mobile device in step 410. That is, the controller 110 of the mobile device may control to display a plurality of objects on the touch screen 190 of the mobile device 100. The objects may be one of icons, widgets, and content, for example. The icons may be shortcut icons for executing a shortcut function, icons for executing applications, or task icons for executing preset functions. The widgets are mini applications for displaying some information about applications corresponding to the widgets. Upon detection of selection of a widget, an application corresponding to the selected widget may be executed. The content may include at least one of text, an image, and a video.

FIGS. 6A to 6E and FIGS. 7A to 7E illustrate parallax scrolling functions according to an exemplary embodiment of the present invention.

Figure 6:
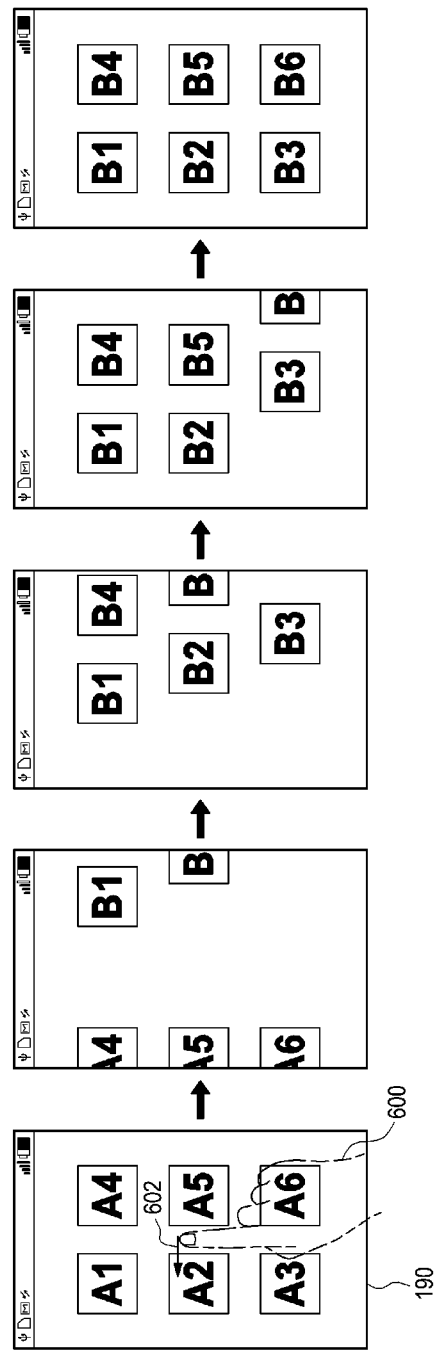
FIGS. 6A to 6E and FIGS. 7A to 7E illustrate parallax scrolling functions according to an exemplary embodiment of the present invention.

Referring to FIG. 6A, the controller 110 of the mobile device 100 displays a plurality of objects A1 to A6 on the touch screen 190. The screen illustrated in FIG. 6A on which the plurality of objects A1 to A6 are displayed will be referred to as a first screen. The objects A1 to A6 may be one of icons, widgets, content, and the like.

Subsequently, the controller 110 detects a touch for scrolling the plurality of objects on the touch screen 190 in step 420. The controller 110 of the mobile device 100 may detect a touch on the touch screen 190. More specifically, the controller 110 may detect a touch for scrolling the plurality of objects on the touch screen 190. The touch may be, for example, a drag or flick. Thus, the controller 110 may detect, for example, a drag or flick for scrolling the plurality of objects. Referring to FIGS. 6A to 6E again, the controller 110 may detect a touch 602 of a user 600 for scrolling the plurality of objects A1 to A6 on the touch screen 190 in FIG. 6A. The touch 602 may be a drag or flick. For example, the touch 602 may be a leftward drag or flick as illustrated in FIG. 6A. The user's leftward drag or flick may mean that the user intends to scroll the first screen to the left. That is, if the user is to scroll the first screen to the left, the user may drag or flick the touch screen to the left. A screen that displays a plurality of objects B1 to B6 in FIG. 6E will be referred to as a second screen. The second screen is to the right of the first screen, hidden from the touch screen 190. If the user wants to scroll from the first screen to the second screen, the user may drag or flick the touch screen to the left.

The controller 110 scrolls the plurality of objects sequentially at different time intervals according to the attributes of the objects in step 430. That is, the controller 110 may sequentially scroll the plurality of objects at different time intervals in response to the touch detected in step 420. The controller 110 may scroll the objects sequentially at different time intervals rather than in the same order.

Figure 5:
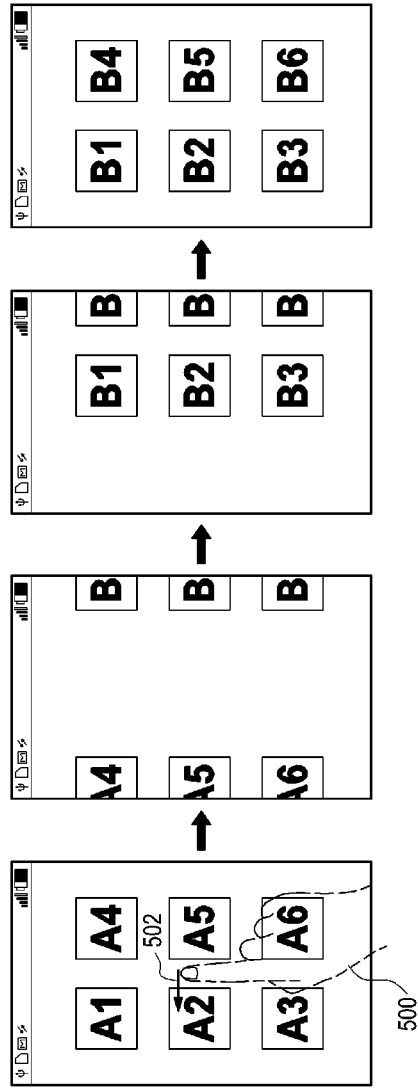
FIGS. 5A to 5D illustrate scrolling functions according to an exemplary embodiment of the present invention.

FIGS. 5A to 5D illustrate screens on which a plurality of objects are scrolled in the same order according to a comparative example. In FIG. 5A, the plurality of objects A1 to A6 are displayed on the touch screen. The plurality of objects are scrolled to the left by a leftward scrolling touch drag 502 of a user 500. Referring to FIG. 5B, the objects A1 to A6 are scrolled to the left on the screen, followed by right-to-left scrolling of the objects B1 to B6 on the screen. The objects B1 to B6 are scrolled in the same order in the comparative example. That is, the objects B1, B2 and B3 are scrolled in the same order in FIG. 5B, followed by the objects B4, B5 and B6 in the same order in FIG. 5C. Thus, the objects B1 to B6 are completely scrolled in FIG. 5D. Due to scrolling of the objects B1 to B6 in the same order, the comparative example of FIGS. 5A to 5D does not exert any particular effect to the user. That is, the plurality of objects are just scrolled in the comparative example of FIGS. 5A to 5D. In contrast, the plurality of objects can be scrolled sequentially at different time intervals according to the attributes of the objects in accordance with exemplary embodiments of the present invention.

Figure 7:
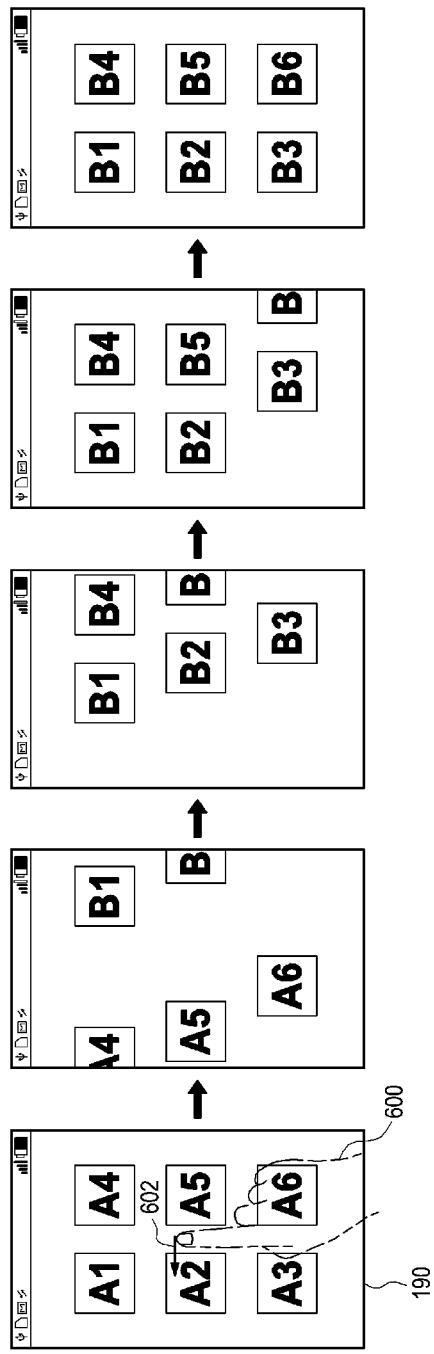

Referring to FIGS. 6A to 6E again, the controller 110 may detect the touch 602 for scrolling the objects A1 to A6 in FIG. 6A. The touch 602 may be a leftward drag or flick as illustrated in FIG. 6A. The controller 110 may then scroll the plurality of objects sequentially at different time intervals according to the attributes of the objects. The attributes may be one of the positions of the objects on the touch screen, the proximity order of the objects relative to a detected touch, and the sizes, time information, on-map position information, search accuracy information, use frequencies, colors, shapes of the objects, and the like. For example, the attributes of the objects may be their positions on the touch screen. The attributes of the objects may be the proximity order of the objects relative to the top, bottom or center of the touch screen. For example, the controller 110 may scroll the objects B1 to B6 sequentially at different time intervals in order of proximity of the objects B1 to B6 to the top of the touch screen, as illustrated in FIG. 6B. Therefore, the object B1 at the top of the touch screen is first scrolled as illustrated in FIG. 6B, followed by the objects B2 and B3 as illustrated in FIG. 6C. The scrolling of the object B1 is completed, followed by the scrolling of the object B2 as illustrated in FIG. 6D and then by the scrolling of the object B3 as illustrated in FIG. 6E. The objects B4, B5 and B6 are scrolled sequentially at different time intervals in the same order as the objects B1, B2 and B3. While the objects A4, A5 and A6 are scrolled away from the screen in the same order in FIG. 6B, they may be scrolled away sequentially at different time intervals according to their attributes like the objects B1 to B6 as illustrated in FIG. 7B. Compared to the example of FIGS. 5A to 5D in which the plurality of objects B1 to B6 are scrolled in the same order, the objects B1 to B6 are sequentially scrolled at different time intervals according to their attributes as illustrated in FIGS. 6A to 6E and FIGS.

7A to 7E in the exemplary embodiment of the present invention. That is, the exemplary embodiment of the present invention offers the benefit of the parallax scrolling function of sequentially scrolling a plurality of objects at different time intervals according to the attributes of the objects.

In a method for controlling a mobile device having a parallax scrolling function according to another exemplary embodiment of the present invention, a plurality of objects may be scrolled sequentially at different time intervals according to the colors or shapes of the objects.

In accordance with the method for controlling a mobile device having a parallax scrolling function according to another exemplary embodiment of the present invention, a plurality of objects are displayed on the touch screen of the mobile device in step 410. That is, the controller 110 of the mobile device 100 may control display of a plurality of objects on the touch screen 190 of the mobile device 100. The objects may be one of icons, widgets, content, and the like for example. The icons may be shortcut icons for executing a shortcut function, icons for executing applications, or task icons for executing preset functions.

Subsequently, the controller 110 detects a touch for scrolling the plurality of objects on the touch screen 190 in step S420. The controller 110 of the mobile device 100 may detect a touch on the touch screen 190. More specifically, the controller 110 may detect a touch for scrolling the plurality of objects on the touch screen 190. The touch may be, for example, a drag or flick. Thus, the controller 110 may detect, for example, a drag or flick for scrolling the plurality of objects.

The controller 110 scrolls the plurality of objects sequentially at different time intervals according to the colors of the objects in step 430. That is, the controller 110 may sequentially scroll the plurality of objects at different time intervals according to the colors of the objects in response to the touch detected in step 420. For example, the controller 110 may sequentially scroll the plurality of objects at different time intervals in a predetermined color order. If the predetermined color order is, for example, the order of dark to light, the controller 110 may scroll the objects sequentially at different time intervals in the order of dark to light. In another example, if the predetermined color order is for example a descending order of color values, brightness values, or chroma values, the controller 110 may scroll the objects sequentially at different time intervals in the descending order of color values, brightness values, or chroma values. For example, the controller 110 may scroll the objects B1 to B6 illustrated in FIG. 6B sequentially at different time intervals in a descending order of brightness values. On the assumption that the objects B1, B2 and B3 are less bright in this order, the object B1 having the highest brightness is first scrolled as illustrated in FIG. 6B, followed by the scrolling of the objects B2 and B3 as illustrated in FIG. 6C. The scrolling of the object B1 is completed, followed by the object B2 as illustrated in FIG. 6D and then by the object B3 as illustrated in FIG. 6E.

In another example, the controller 110 may sequentially scroll the plurality of objects at different time intervals according to the shapes of the objects. The controller 110 may sequentially scroll the plurality of objects at different time intervals according to the shapes of the objects in response to the touch detected in step 420. For example, the controller 110 may sequentially scroll the plurality of objects at different time intervals in a predetermined shape order. If the predetermined shape order is, for example, the order of angular shapes, the controller 110 may scroll the objects sequentially at different time intervals in a descending order of angular shapes. On the assumption that the objects B1, B2 and B3 are less angular in this order, the most angular object B1 is first scrolled, followed by scrolling of the object B2 and then the object B3. The scrolling of the object B1 is completed, followed by scrolling of the object B2 and then the object B3.

As described above, exemplary embodiments of the present invention advantageously provide a parallax scrolling function of sequentially scrolling a plurality of objects at different time intervals according to their colors or shapes. Therefore, a user can readily identify the colors or shapes of the objects from the scrolling order of the objects. That is, since the objects are sequentially scrolled at different time intervals according to their colors or shapes, the colors or shapes of the objects can be readily perceived to the user.

Figure 8:
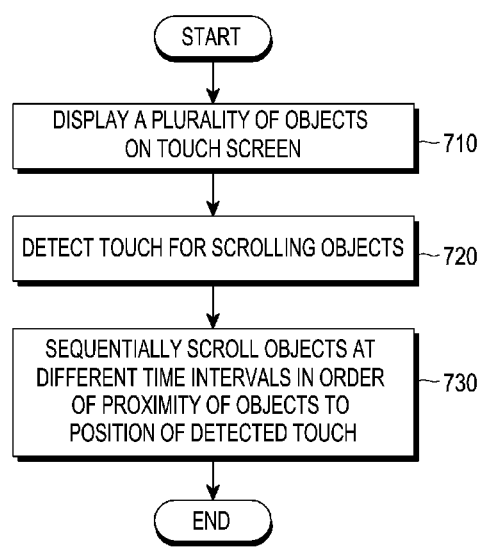
FIG. 8 is a flowchart illustrating a method for controlling a mobile device having a parallax scrolling function according to another exemplary embodiment of the present invention.
Figure 9:
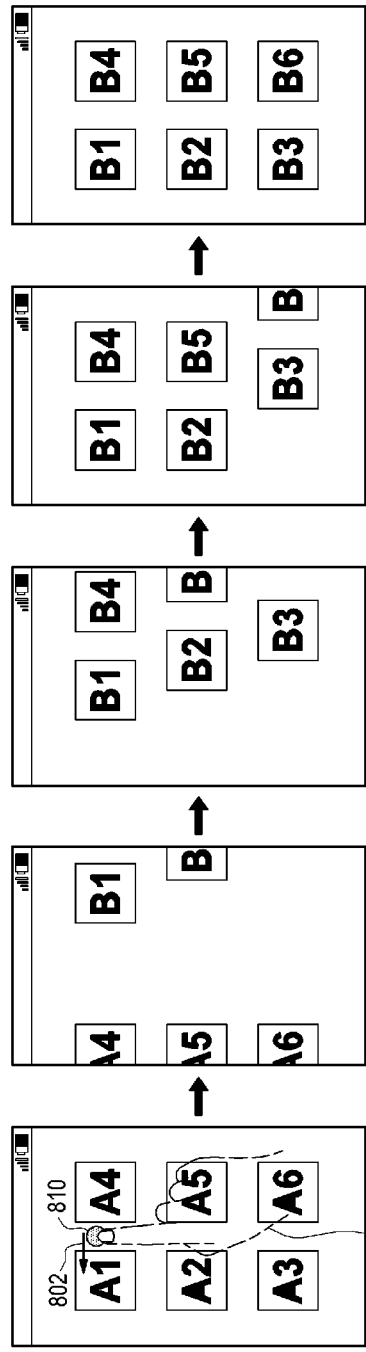
Figure 10:
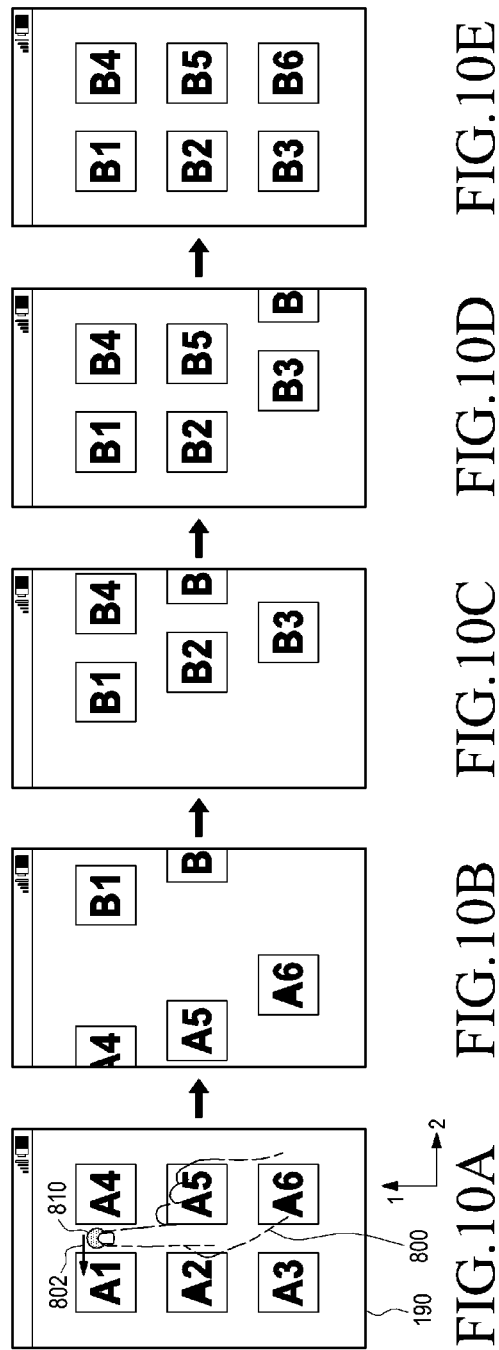
Figure 11:
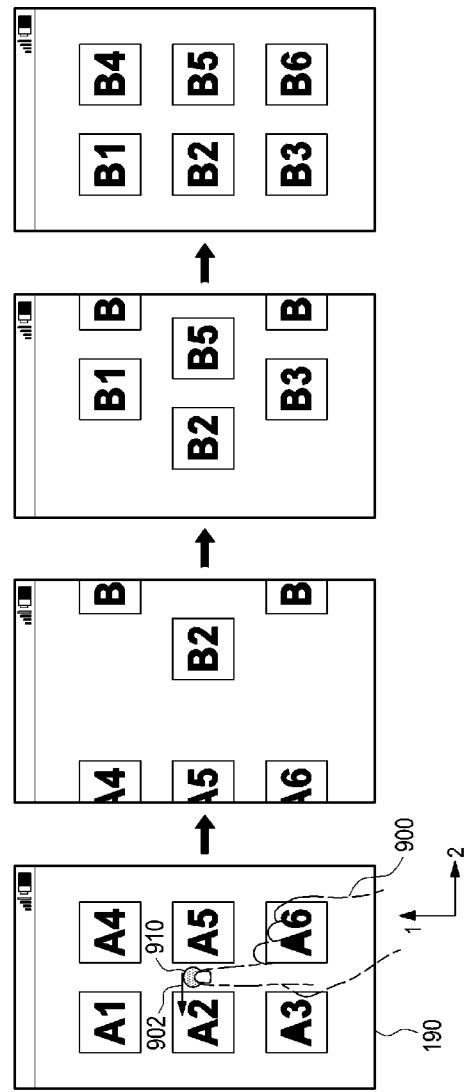
Figure 12:
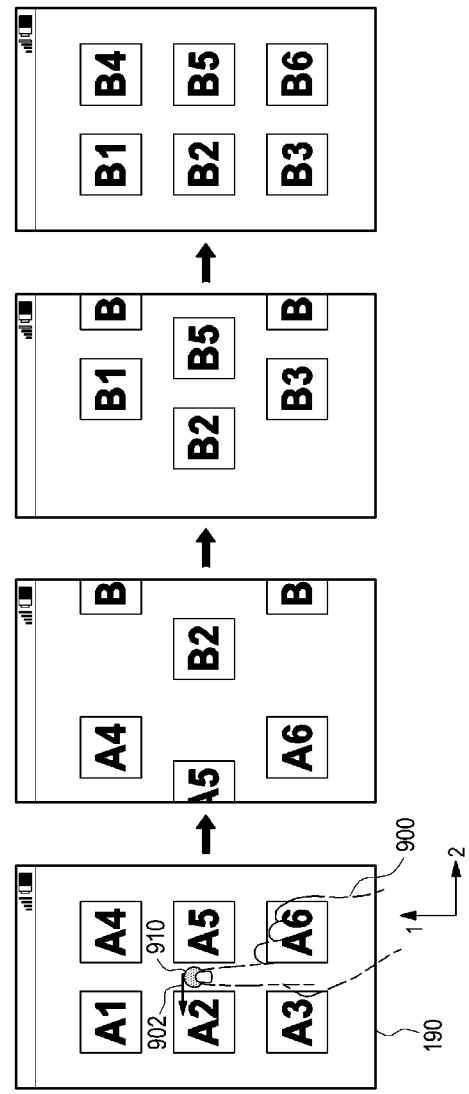
Figure 13:
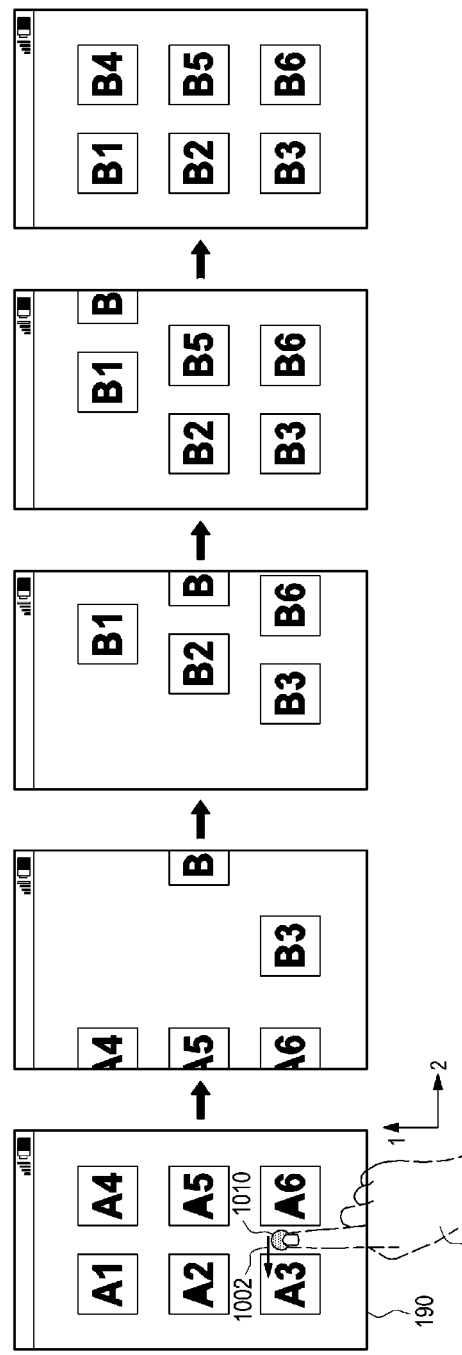
Figure 14:
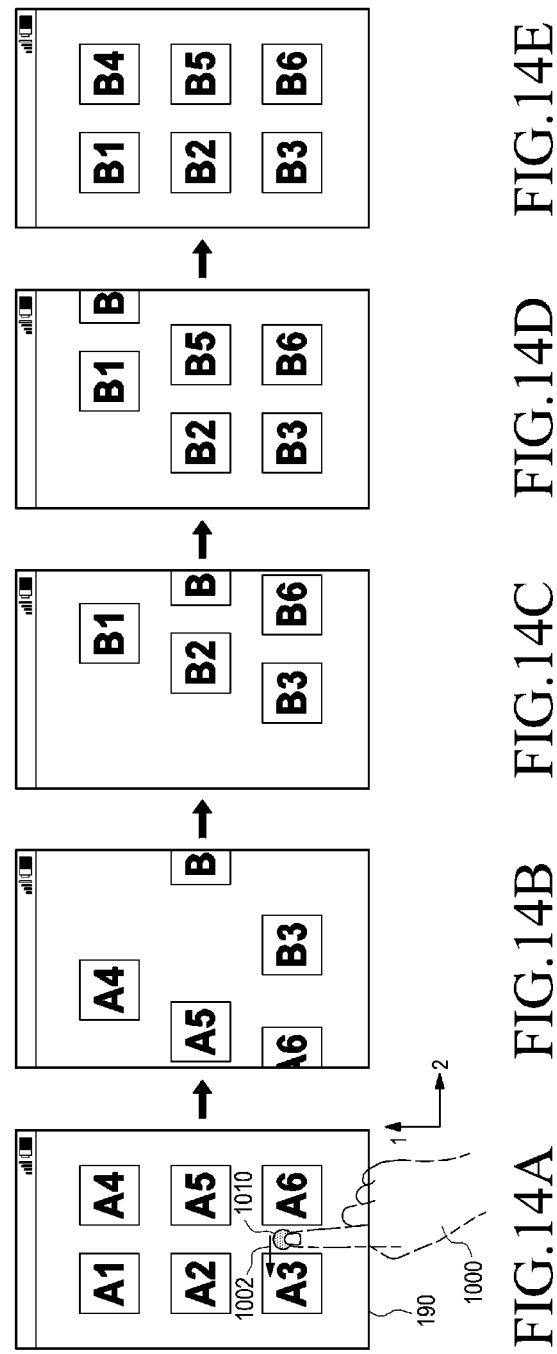

FIG. 8 is a flowchart illustrating a method for controlling a mobile device having a parallax scrolling function according to an exemplary embodiment of the present invention. In the method for controlling a mobile device having a parallax scrolling function according to the exemplary embodiment of the present invention illustrated in FIGS. 8 to 14E, a plurality of objects may be sequentially scrolled at different time intervals in order of proximity of the objects to the position of a detected touch.

Referring to FIG. 8, a plurality of objects are displayed on the touch screen of the mobile device in step 710. That is, the controller 110 of the mobile device 100 may control display of a plurality of objects on the touch screen 190 of the mobile device 100. The objects may be one of icons, widgets, content, and the like for example. The icons may be shortcut icons for executing a shortcut function, icons for executing applications, or task icons for executing preset functions. FIGS. 9A to 10E illustrate parallax scrolling functions of sequentially scrolling a plurality of objects at different time intervals in order of proximity of the objects to the position of a detected touch according to an exemplary embodiment of the present invention.

Referring to FIG. 9A, the controller 110 of the mobile device 100 displays the plurality of objects A1 to A6 on the touch screen 190. The screen illustrated in FIG. 9A on which the plurality of objects A1 to A6 are displayed will be referred to as a first screen. The objects A1 to A6 may be one of icons, widgets, and content, for example.

Subsequently, the controller 110 detects a touch for scrolling the plurality of objects on the touch screen 190 in step 720. The controller 110 of the mobile device 100 may detect a touch on the touch screen 190. More specifically, the controller 110 may detect a touch for scrolling the plurality of objects on the touch screen 190. The touch may be, for example, a drag or flick. Thus, the controller 110 may detect, for example, a drag or flick for scrolling the plurality of objects.

Referring to FIGS. 9A to 9E again, the controller 110 may detect a touch 802 of a user 800 for scrolling the plurality of objects A1 to A6 on the touch screen 190 in 9A. The touch 802 may be a drag or flick. For example, the touch 802 may be a leftward drag or flick as illustrated in FIG. 9A. The user's leftward drag or flick may mean that the user intends to scroll the first screen to the left. That is, if the user is to scroll the first screen to the left, the user may drag or flick the touch screen to the left. A screen that displays the plurality of objects B1 to B6 in FIG. 9E will be referred to as a second screen. The second screen is to the right of the first screen, hidden from the touch screen 190. If the user wants to scroll from the first screen to the second screen, the user may drag or flick the touch screen to the left.

The controller 110 scrolls the plurality of objects sequentially at different time intervals in order of proximity of the objects to the position of the detected touch in step 730. That is, the controller 110 may sequentially scroll the plurality of objects at different time intervals in order of proximity to the touched position detected in step 720. Referring to FIGS. 9A to 9E again, the controller 110 may detect the touch 802 for scrolling the objects A1 to A6 in FIG. 9A. The touch 802 may be a leftward drag or flick as illustrated in FIG. 9A. The controller 110 may then scroll the plurality of objects sequentially at different time intervals in order of proximity of the objects to the detected touched position. For example, the controller 110 may scroll the objects B1 to B6 sequentially at different time intervals in order of proximity of the objects B1 to B6 to the position 810 of the detected touch in step 730, as illustrated in FIG. 9B. Therefore, the object B1 nearest to the detected touched position 810 is first scrolled as illustrated in FIG. 9B, followed by the object B2 second-nearest to the detected touched position 810 and the object B3 third-nearest to the detected touched position 810 as illustrated in FIG. 9C. The scrolling of the object B1 is completed, followed by the scrolling of the object B2 as illustrated in FIG. 9D and then by the scrolling of the object B3 as illustrated in FIG. 9E. The objects B4, B5 and B6 are scrolled sequentially at different time intervals in the same order as the objects B1, B2 and B3. While the objects A4, A5 and A6 are scrolled away from the screen in the same order in FIG. 9B, they may be scrolled away sequentially at different time intervals in order of proximity of the objects to the detected touched position like the objects B1 to B6 as illustrated in FIG. 10B.

In other words, if a plurality of objects are displayed sequentially along a first axis, the controller 110 may scroll the plurality of objects sequentially at different time intervals at a first speed with a first acceleration along a second axis perpendicular to the first axis in order of proximity of the objects to a point on the first axis. Referring to FIGS. 9A to 9E again, the first screen on which the objects A1 to A6 are displayed as illustrated in FIG. 9A may be scrolled to the second screen on which the objects B1 to B6 are displayed as illustrated in FIG. 9E. In FIG. 9A, the plurality of objects may be displayed sequentially along the first axis, for example, along the Y axis. That is, the objects A1 to A6 are displayed along the Y axis in the order of A1, A2, and A3 and then in the order of A4, A5 and A6. In FIG. 9E, the objects B1 to B6 are displayed along the Y axis in the order of B1, B2, and B3 and then in the order of B4, B5 and B6. The controller 110 may scroll the plurality of objects sequentially at different time intervals at the first speed with the first acceleration along the second axis perpendicular to the first axis in order of proximity of the objects to a point on the first axis. In FIG. 9A, the objects A1, A2 and A3 are nearer in this order to the detected touched point 810 on the first axis. In FIG. 9C, the objects B1, B2 and B3 are nearer in this order to the detected touched point 810 on the first axis. Therefore, the controller 110 may scroll the objects B1, B2 and B3 in this order, sequentially at different time intervals in order of proximity of the objects B1, B2 and B3 to the detected touched point of the first axis. Herein, the controller 110 may scroll the objects along the second axis perpendicular to the first axis. For example, the controller 110 may sequentially scroll the objects B1, B2 and B3 at different time intervals along the second axis being the X axis perpendicular to the first axis being the Y axis, as illustrated in FIG. 9A. Therefore, the object B1 nearest to the detected touched point 810 on the first axis is first scrolled along the second axis perpendicular to the first axis, as illustrated in FIG. 9B, followed by the object B1 second-nearest to the point 810 and then the object B2 third-nearest to the point 810 as illustrated in FIG. 9C. The scrolling of the object B1 is completed, followed by the scrolling of the object B2 as illustrated in FIG. 9D and then by the scrolling of the object B3 as illustrated in FIG. 9E. The objects B4, B5 and B6 are also scrolled sequentially at different time intervals in the same order as the objects B1, B2 and B3.

Therefore, exemplary embodiments of the present invention advantageously provide a parallax scrolling function of sequentially scrolling a plurality of objects at different time intervals in order of proximity of the objects to a detected touched position. A user may want to scroll a specific object first from among the plurality of objects. When the user touches an intended position to be scrolled with priority on the touch screen, the controller 110 of the mobile device 100 may scroll the plurality of objects sequentially at different time intervals in order of proximity of the objects to the detected position. In this manner, the parallax scrolling function is provided, in which a touch on a position to be scrolled first on the touch screen is detected and a plurality of objects are sequentially scrolled at different time intervals in order of proximity of the objects to the touched position. For example, when the user wants to first scroll an object at the top of the screen, the user may touch the top of the screen to thereby scroll the objects as illustrated in FIGS. 9A to 10E. Since the mobile device detects the touch and scrolls the plurality of objects sequentially at different time intervals in order of proximity of the objects to the detected touched position, the user may see the intended object scrolled first from among the objects.

FIGS. 11A to 12D illustrate a parallax scrolling function of sequentially scrolling a plurality of objects at different time intervals in order of proximity of the objects to a detected touched position according to an exemplary embodiment of the present invention.

Referring to FIG. 11A, the controller 110 of the mobile device 100 displays the plurality of objects A1 to A6 on the touch screen 190. Subsequently, the controller 110 may detect a touch 902 of a user 900 for scrolling the plurality of objects A1 to A6 on the touch screen 190. The touch 902 may be a leftward drag or flick as illustrated in FIG. 11A. The controller 110 may scroll the plurality of objects sequentially at different time intervals in order of proximity of the objects to the position of the detected touch. For example, the controller 110 may scroll the objects B1 to B6 at different time intervals in order of proximity of the objects B1 to B6 to the position 910 of the detected touch, as illustrated in FIG. 11B. Therefore, the object B2 nearest to the detected touched position 910 is first scrolled as illustrated in FIG. 11B, followed by the object B1 second-nearest to the detected touched position 910 and the object B3 third-nearest to the detected touched position 910 as illustrated in FIG. 11C. The scrolling of the object B2 is completed as illustrated in FIG. 11C, followed by the completed scrolling of the object B1 and then the completed scrolling of the object B3 as illustrated in FIG. 11D. The objects B4, B5 and B6 are scrolled sequentially at different time intervals in the same order as the objects B1, B2 and B3. While the objects A4, A5 and A6 are scrolled away from the screen in the same order in FIG. 11B, they may be scrolled away sequentially at different time intervals in order of proximity of the objects to the detected touched position like the objects B1 to B6, as illustrated in FIG. 12B.

In other words, if a plurality of objects are displayed sequentially along a first axis, the controller 110 may scroll the plurality of objects sequentially at different time intervals at a first speed with a first acceleration along a second axis perpendicular to the first axis in order of proximity of the objects to a point on the first axis. Referring to FIG. 11A again, the objects A1 to A6 are displayed along the Y axis in the order of A1, A2, and A3 and then in the order of A4, A5 and A6. In FIG. 11D, the objects B1 to B6 are displayed along the Y axis in the order of B1, B2, and B3 and then in the order of B4, B5 and B6. The controller 110 may scroll the plurality of objects sequentially at different time intervals at the first speed with the first acceleration along the second axis perpendicular to the first axis in order of proximity of the objects to a point on the first axis. In FIG. 11A, the objects A2, A1 and A3 are nearer in this order to the detected touched point 910 on the first axis. In FIG. 11D, the objects B2, B1 and B3 are nearer in this order to the detected touched point 910 on the first axis. Therefore, the controller 110 may scroll the objects B2, B1 and B3 in this order, sequentially at different time intervals in proximity to the detected touched point of the first axis. Therefore, the object B2 nearest to the detected touched point 910 on the first axis is first scrolled along the second axis perpendicular to the first axis, as illustrated in FIG. 11B, followed by the object B1 second-nearest to the point 910 and then the object B3 third-nearest to the point 910 as illustrated in FIG. 11C. The scrolling of the object B2 is completed, followed by the object B1 and then the object B3 as illustrated in FIG. 11D. The objects B4, B5 and B6 are also scrolled sequentially at different time intervals in the same order as the objects B1, B2 and B3.

Therefore, exemplary embodiments of the present invention advantageously provide a parallax scrolling function of sequentially scrolling a plurality of objects at different time intervals in order of proximity of the objects to a detected touched position. For example, if a user wants to scroll a specific object at the center of the screen first from among the plurality of objects as illustrated in FIGS. 11A to 12D, the user may scroll the plurality of objects by touching the center of the screen. Then the mobile device detects the touch and scrolls the plurality of objects sequentially at different time intervals in order of proximity of the objects to the detected touched position. In this manner, the parallax scrolling function is provided, in which a touch on a position to be scrolled first on the touch screen is detected and a plurality of objects are sequentially scrolled at different time intervals in order of proximity of the objects to the touched position.

FIGS. 13A to 14E illustrate parallax scrolling functions of sequentially scrolling a plurality of objects at different time intervals in order of proximity of the objects to a detected touched position according to an exemplary embodiment of the present invention.

Referring to FIG. 13A, the controller 110 of the mobile device 100 displays the plurality of objects A1 to A6 on the touch screen 190. Subsequently, the controller 110 may detect a touch 1002 of a user 1000 for scrolling the plurality of objects A1 to A6 on the touch screen 190. The touch 1002 may be a leftward drag or flick as illustrated in FIG. 13A. The controller 110 may scroll the plurality of objects sequentially at different time intervals in order of proximity of the objects to the position of the detected touch. For example, the controller 110 may scroll the objects B1 to B6 at different time intervals in order of proximity of the objects B1 to B6 to the position 1010 of the detected touch, as illustrated in FIG. 13B. Therefore, the object B3 nearest to the detected touched position 1010 is first scrolled, followed by the object B2 second-nearest to the detected touched position 1010 as illustrated in FIG. 13B and then the object B1 third-nearest to the detected touched position 1010 as illustrated in FIG. 13C. The scrolling of the objects B1, B2 and B3 are completed sequentially in the order of B3, B2, and B1 as illustrated in FIGS. 13C, 13D and 13E. The objects B4, B5 and B6 are scrolled sequentially at different time intervals in the same order as the objects B1, B2 and B3. While the objects A4, A5 and A6 are scrolled away from the screen in the same order in FIG. 13B, they may be scrolled away sequentially at different time intervals in order of proximity of the objects to the detected touched position like the objects B1 to B6, as illustrated in FIG. 14B.

In other words, if a plurality of objects are displayed sequentially along a first axis, the controller 110 may scroll the plurality of objects sequentially at different time intervals at a first speed with a first acceleration along a second axis perpendicular to the first axis in order of proximity of the objects to a point on the first axis. Referring to FIG. 13A again, the objects A1 to A6 are displayed along the Y axis in the order of A1, A2, and A3 and then in the order of A4, A5 and A6. In FIG. 13E, the objects B1 to B6 are displayed along the Y axis in the order of B1, B2, and B3 and then in the order of B4, B5 and B6. The controller 110 may scroll the plurality of objects sequentially at different time intervals at the first speed with the first acceleration along the second axis perpendicular to the first axis in order of proximity of the objects to a point on the first axis. In FIG. 13A, the objects A3, A2 and A1 are nearer in this order to the detected touched point 1010 on the first axis. In FIG. 13E, the objects B3, B2 and B1 are nearer in this order to the detected touched point 1010 on the first axis. Therefore, the controller 110 may scroll the objects B1, B2 and B3 sequentially at different time intervals in order of proximity to the detected touched point of the first axis, thus in the order of B3, B2 and B1. Therefore, the object B3 nearest to the detected touched point 1010 on the first axis is first scrolled along the second axis perpendicular to the first axis, as illustrated in FIG. 13B, followed by the object B2 second-nearest to the point 1010 and then the object B1 third-nearest to the point 910 as illustrated in FIG. 13C. The scrolling of the object B3 is completed, followed by the object B2 as illustrated in FIG. 13C and then the object B1 as illustrated in FIG. 13D. The objects B4, B5 and B6 are also scrolled sequentially at different time intervals in the same order as the objects B1, B2 and B3.

Therefore, exemplary embodiments of the present invention advantageously provide a parallax scrolling function of sequentially scrolling a plurality of objects at different time intervals in order of proximity of the objects to a detected touched position. For example, if a user wants to scroll a specific object located at the bottom of a screen, first from among the plurality of objects as illustrated in FIGS. 13A to 14E, the user may scroll the plurality of objects by touching the bottom of the screen. Then the mobile device detects the touch and scrolls the plurality of objects sequentially at different time intervals in order of proximity of the objects to the detected touched position, starting with the object that the user wants to first scroll.

Accordingly, while the plurality of objects B1 to B6 are scrolled in the same order in the example illustrated in FIGS. 5A to 5D, the plurality of objects B1 to B6 are scrolled sequentially at different time intervals in order of proximity to the position of a detected touch as illustrated in FIGS. 9A to 14E in the exemplary embodiments of the present invention.

Figure 15:
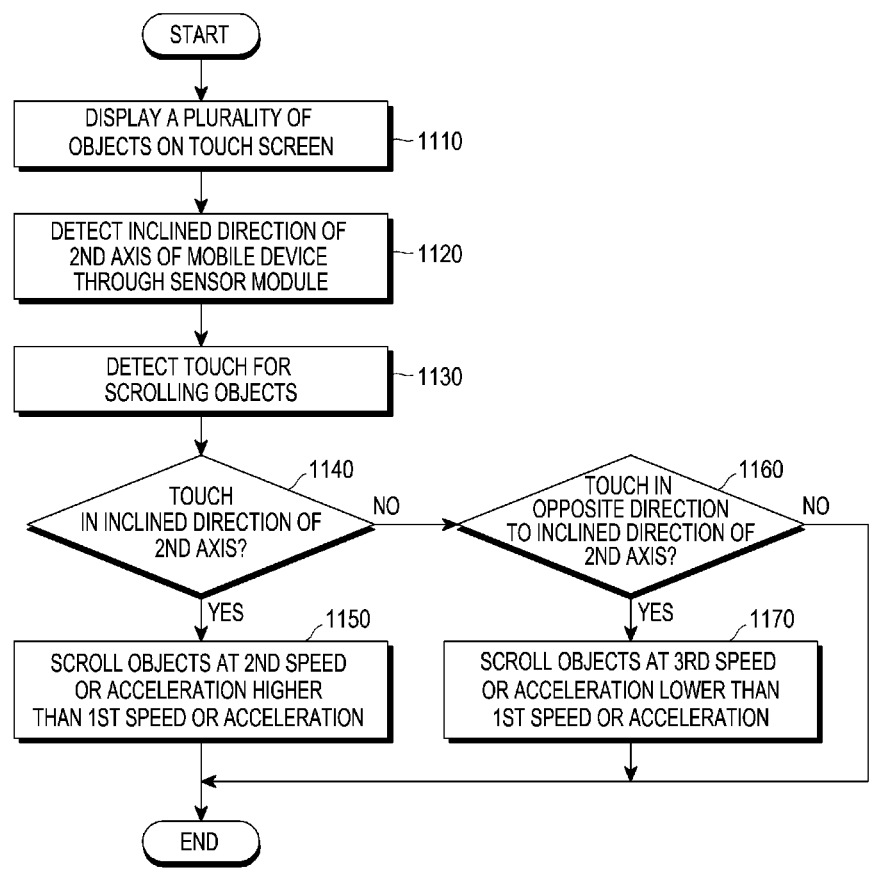
FIG. 15 is a flowchart illustrating a method for controlling a mobile device having a parallax scrolling function according to an exemplary embodiment of the present invention.

FIG. 15 is a flowchart illustrating a method for controlling a mobile device having a parallax scrolling function according to another exemplary embodiment of the present invention, and FIGS. 16A to 20E illustrate parallax scrolling functions of sequentially scrolling a plurality of objects at different time intervals according to the inclined direction and inclination angle of the mobile device according to an exemplary embodiment of the present invention.

Referring to FIG. 15, a plurality of objects are displayed on the touch screen of the mobile device in step 1110. That is, the controller 110 of the mobile device 100 may control display of the plurality of objects on the touch screen 190. The objects may be one of icons, widgets, content, and the like for example. The icons may be shortcut icons for executing a shortcut function, icons for executing applications, or task icons for executing preset functions. Referring to FIG. 16A, the controller 110 of the mobile device 100 displays the plurality of objects A1 to A6 on the touch screen 190. The objects A1 to A6 may be one of icons, widgets, and content, for example.

Subsequently, the sensor module detects the inclined direction of a second axis of the mobile device in step 1120. The plurality of objects may be displayed sequentially along a first axis on the touch screen 190. For example, the plurality of objects may be sequentially displayed along the first axis, for example, along the Y axis, as illustrated in FIG. 16A. That is, the objects are arranged sequentially along the Y axis being the first axis in the order of A1, A2 and A3 and then A4, A5 and A6 in FIG. 16A. The sensor module may detect the inclined direction of the second axis perpendicular to the first axis. For example, the sensor module may detect the inclined direction of the X axis being the second axis perpendicular to the Y axis being the first axis, as illustrated in FIG. 16B. That is, the sensor module may sense that the mobile device 100 has been inclined in the direction from the second axis 2-1 to the second axis 2-2. For example, the sensor module may detect a left downward inclination of the X axis of the mobile device in FIG. 16(b). In another example, the objects are arranged sequentially along the X axis being the first axis in the order of A4 and A1, A5 and A2, and A6 and A3 in FIG. 18A. Herein, the sensor module may detect the inclined direction of the second axis perpendicular to the first axis. For example, the sensor module may detect the inclined direction of the Y axis being the second axis perpendicular to the X axis being the first axis, as illustrated in FIG. 18B. That is, the sensor module may detect the inclined direction of the mobile device from the second axis 2-1 toward the second axis 2-2. For example, the sensor module may detect a leftward inclination of the Y axis of the mobile device in FIG. 18B. In a further example, the objects are arranged sequentially along the Y axis being the first axis in the order of A1, A2 and A3 and then A4, A5 and A6 in FIG. 19A. The sensor module may detect the inclined direction of the Z axis being the second axis perpendicular to the Y axis being the first axis, as illustrated in FIG. 19B. That is, the sensor module may detect the inclined direction of the mobile device from the second axis 2-1 toward the second axis 2-2. For example, the sensor module may detect a downward inclination of the Z axis of the mobile device in FIG. 19B.

The controller 110 detects a touch for scrolling the plurality of objects on the touch screen in step 1130. The controller 110 of the mobile device 100 may detect a touch on the touch screen 190. More specifically, the controller 110 may detect a touch for scrolling the plurality of objects on the touch screen 190. The touch may be, for example, a drag or flick. Thus, the controller 110 may detect, for example, a drag or flick for scrolling the plurality of objects. Referring to FIG. 16C, the controller 110 may detect a touch 1202 of a user 1200 for scrolling the plurality of objects A1 to A6 on the touch screen 190. The touch 1202 may be a drag or flick. For example, the touch 1202 may be a leftward drag or flick, as illustrated in FIG. 16C.

If the touch has been made in the inclined direction of the second axis, the controller 110 may scroll the plurality of objects at a second speed higher than the first speed or at a second acceleration higher than the first acceleration. If the touch has been made in the opposite direction to the inclined direction of the second axis, the controller 110 may scroll the plurality of objects at a third speed lower than the first speed or at a third acceleration lower than the first acceleration. If the touch has been made in the inclined direction of the second axis, the controller 110 may scroll the plurality of objects in order of proximity of the objects to the detected touched position at the second speed higher than the first speed or at the second acceleration higher than the first acceleration. If the touch has been made in the opposite direction to the inclined direction of the second axis, the controller 110 may scroll the plurality of objects in order of proximity of the objects to the detected touched position at the third speed lower than the first speed or at the third acceleration lower than the first acceleration in steps 1140 to 1170. The first speed and acceleration mean a predetermined initial speed and acceleration before the mobile device 100, particularly the second axis is inclined.

For example, the sensor module may detect the inclined direction of the X axis being the second axis perpendicular to the Y axis in step 1140, as illustrated in FIG. 16B. That is, the sensor module may detect that the mobile device has been inclined from the second axis 2-1 toward the second axis 2-2. For example, the sensor module may detect that the X axis of the mobile device has been inclined in a left downward direction.

If the touch has been made in the inclined direction of the second axis in step 1140, the controller 110 may scroll the plurality of objects in order of proximity of the objects to the detected touched position at the second speed higher than the first speed or at the second acceleration higher than the first acceleration in step 1150. For example, in the case of a touch 1202 in a left downward direction in which the X axis being the second axis of the mobile device has been inclined as illustrated in FIG. 16C, the controller 110 may scroll the plurality of objects A1 to A6 in order of proximity of the objects to the detected touched position at the second speed higher than the first speed or at the second acceleration higher than the first acceleration. That is, the controller 110 may scroll the plurality of objects A1 to A6 in order of proximity of the objects to the detected touched position at the second speed higher than the preset initial speed before the inclination of the second axis or at the second acceleration higher than the preset initial acceleration before the inclination of the second axis. Thus, the controller 110 may scroll the plurality of objects A1 to A6 in order of proximity to the detected touched position, that is, in the order of A1, A2 and A3 and A4, A5 and A6 at the second speed or acceleration. That is, the controller 110 may scroll the object A1 first and then the objects A2 and A3 at the second speed or acceleration higher than the preset initial speed or acceleration before the inclination of the second axis. The controller 110 may scroll the objects A4, A5 and A6 in the same order as the objects A1, A2 and A3.

If the touch has been made in the opposite direction to the inclined direction of the second axis in step 1160, the controller 110 may scroll the plurality of objects in order of proximity of the objects to the detected touched position at the third speed or acceleration lower than the first speed or acceleration in step 1170. For example, in the case of a touch

1302 of a user 1300 in a right upward direction opposite to the direction in which the X axis being the second axis of the mobile device has been inclined as illustrated in FIG. 17C, the controller 110 may scroll the plurality of objects A1 to A6 in order of proximity of the objects to the detected touched position at the third speed lower than the first speed or at the second acceleration higher than the first acceleration. That is, the controller 110 may scroll the plurality of objects A1 to A6 in order of proximity of the objects to the detected touched position at the third speed lower than the preset initial speed before the inclination of the second axis or at the third acceleration lower than the preset initial acceleration before the inclination of the second axis. Thus, the controller 110 may scroll the plurality of objects A1 to A6 in order of proximity to the detected touched position, that is, in the order of A1, A2 and A3 and A4, A5 and A6 at the third speed or acceleration. That is, the controller 110 may scroll the object A1 first and then the objects A2 and A3 at the third speed or acceleration lower than the preset initial speed or acceleration before the inclination of the second axis. The controller 110 may scroll the objects A4, A5 and A6 in the same order as the objects A1, A2 and A3.

Therefore, exemplary embodiments of the present invention advantageously provide a parallax scrolling function of detecting the inclined direction of a mobile device through a sensor module and sequentially scrolling a plurality of objects at different time intervals according to the inclined direction of the mobile device. Upon detection of a touch in the inclined direction of the mobile device, the plurality of objects can be scrolled sequentially at different time intervals at a speed or acceleration higher than an initial speed or acceleration. Upon detection of a touch in the opposite direction to the inclined direction of the mobile device, the plurality of objects can be scrolled sequentially at different time intervals at a speed or acceleration lower than the initial speed or acceleration. Accordingly, if a user wants to scroll the plurality of objects fast, the user has only to incline the mobile device in the same direction as the scroll direction. If the user wants to scroll the plurality of objects slowly, the user has only to incline the mobile device in the opposite direction to the scroll direction. Hence, the exemplary embodiment of the present invention provides the function of scrolling a plurality of objects faster or slower than an initial speed or acceleration using a sensor module.

In another example, the sensor module may detect the inclined direction of the Y axis being the second axis perpendicular to the X axis being the first axis in step 1120, as illustrated in FIG. 18B. That is, the sensor module may detect that the mobile device has been inclined from the second axis 2-1 toward the second axis 2-2. If the touch has been made in the inclined direction of the second axis, the controller 110 may scroll the plurality of objects in order of proximity of the objects to the detected touched position at the second speed higher than the first speed or at the second acceleration higher than the first acceleration. For example, in the case of a touch 1402 of a user 1400 in a left direction in which the Y axis being the second axis of the mobile device has been inclined as illustrated in FIG. 18C, the controller 110 may scroll the plurality of objects A1 to A6 in order of proximity of the objects to the detected touched position at the second speed higher than the first speed or at the second acceleration higher than the first acceleration. That is, the controller 110 may scroll the plurality of objects A1 to A6 in order of proximity of the objects to the detected touched position at the second speed higher than the preset initial speed before the inclination of the second axis or at the second acceleration higher than the preset initial acceleration before the inclination of the second axis. On the other hand, if the touch has been made in the opposite direction to the inclined direction of the second axis, the controller 110 may scroll the plurality of objects in order of proximity of the objects to the detected touched position at the third speed or acceleration lower than the first speed or acceleration. For example, in the case of a touch 1404 in a right direction opposite to the direction in which the Y axis being the second axis of the mobile device has been inclined as illustrated in FIG. 18C, the controller 110 may scroll the plurality of objects A1 to A6 in order of proximity of the objects to the detected touched position at the third speed lower than the first speed or at the second acceleration higher than the first acceleration. That is, the controller 110 may scroll the plurality of objects A1 to A6 in order of proximity of the objects to the detected touched position at the third speed lower than the preset initial speed before the inclination of the second axis or at the third acceleration lower than the preset initial acceleration before the inclination of the second axis.

In another example, the sensor module may detect the inclined direction of the Z axis being the second axis perpendicular to the Y axis being the first axis in step 1120, as illustrated in FIG. 19B. That is, the sensor module may detect that the mobile device has been inclined from the second axis 2-1 toward the second axis 2-2. If the touch has been made in the inclined direction of the second axis, the controller 110 may scroll the plurality of objects in order of proximity of the objects to the detected touched position at the second speed higher than the first speed or at the second acceleration higher than the first acceleration. For example, in the case of a touch 1502 by a user 1500 in a downward direction in which the Z axis being the second axis of the mobile device has been inclined as illustrated in FIG. 19C, the controller 110 may scroll the plurality of objects A1 to A6 in order of proximity of the objects to the detected touched position at the second speed higher than the first speed or at the second acceleration higher than the first acceleration. That is, the controller 110 may scroll the plurality of objects A1 to A6 in order of proximity of the objects to the detected touched position at the second speed higher than the preset initial speed before the inclination of the second axis or at the second acceleration higher than the preset initial acceleration before the inclination of the second axis. On the other hand, if the touch has been made in the opposite direction to the inclined direction of the second axis, the controller 110 may scroll the plurality of objects in order of proximity of the objects to the detected touched position at the third speed or acceleration lower than the first speed or acceleration. For example, in the case of a touch 1504 in an upward direction opposite to the direction in which the Z axis being the second axis of the mobile device has been inclined as illustrated in FIG. 19C, the controller 110 may scroll the plurality of objects A1 to A6 in order of proximity of the objects to the detected touched position at the third speed lower than the first speed or at the second acceleration higher than the first acceleration. That is, the controller 110 may scroll the plurality of objects A1 to A6 in order of proximity of the objects to the detected touched position at the third speed lower than the preset initial speed before the inclination of the second axis or at the third acceleration lower than the preset initial acceleration before the inclination of the second axis.

In another example, the sensor module may detect the inclination angle of the second axis as well as the inclined direction of the second axis in the mobile device in step 1120. In steps 1140 to 1170, the controller 110 may scroll the plurality of objects by increasing the second speed or acceleration or decreasing the third speed or acceleration in proportion to the inclination angle. FIGS. 20A to 20E illustrate parallax scrolling functions of sequentially scrolling a plurality of objects at different time intervals according to the inclined direction and inclination degree of the mobile device according to an exemplary embodiment of the present invention.

For example, the sensor module may detect the inclined direction and inclination angle of the second axis being the X axis perpendicular to the first axis being the Y axis in step 1120, as illustrated in FIGS. 20B and 20D. That is, the sensor module may detect a direction 1610 and angle 1620 in which the mobile device has been inclined from the second axis 2-1 to the second axis 2-2. For example, the sensor module may detect the left downward inclination 1610 of the X axis and the inclination angle 1620 of the X axis in the mobile device in FIGS. 20B and 20D. In addition, the controller 110 may detect that the inclination angle 1610 of the second axis in FIG. 20B is smaller than the inclination angle 1620 of the second axis in FIG. 20D.

If the touch has been has been made in the inclined direction of the second axis in step 1140, the controller 110 may scroll the plurality of objects in order of proximity of the objects to the detected touched position at the second speed higher than the first speed or at the second acceleration higher than the first acceleration in step 1150. For example, in the case of a touch 1602 by a user 1600 in a left downward direction in which the X axis being the second axis of the mobile device has been inclined as illustrated in FIG. 20C, the controller 110 may scroll the plurality of objects A1 to A6 in order of proximity of the objects to the detected touched position at the second speed higher than the first speed or at the second acceleration higher than the first acceleration. That is, the controller 110 may scroll the plurality of objects A1 to A6 in order of proximity of the objects to the detected touched position at the second speed higher than the preset initial speed before the inclination of the second axis or at the second acceleration higher than the preset initial acceleration before the inclination of the second axis.

Herein, the controller 110 may scroll the plurality of objects by increasing the second speed or acceleration in proportion to the inclination angle detected by the sensor module. That is, as described before with reference to FIGS. 20B and 20D, the controller 110 may detect that the inclination angle 1610 of the second axis in FIG. 20B is smaller than the inclination angle 1620 of the second axis in FIG. 20D. Thus, the controller 110 may set the second speed or acceleration for scrolling the plurality of objects in FIGS. 20D and 20E to be larger than the second speed or acceleration for scrolling the plurality of objects in FIGS. 20B and 20C, in proportion to the inclination angle detected by the sensor module. If the second speed or acceleration for scrolling the plurality of objects in FIGS. 20B and 20C is referred to as a fourth speed or acceleration and the second speed or acceleration for scrolling the plurality of objects in FIGS. 20D and 20E is referred to as a fifth speed or acceleration, the controller 110 may scroll the plurality of objects A1 to A6 by setting the fifth speed or acceleration to be larger than the fourth speed or acceleration. For example, in the case of a touch 1603 by a user 1601 in a left downward direction in which the X axis being the second axis of the mobile device has been inclined as illustrated in FIG. 20D, the controller 110 may scroll the plurality of objects A1 to A6 in order of proximity of the objects to the detected touched position at the fifth speed higher than the fourth speed or at the fifth acceleration higher than the fourth acceleration.

Accordingly, exemplary embodiments of the present invention are advantageous in that the inclined direction and inclination angle of the mobile device are detected through the sensor module and a speed or acceleration for scrolling a plurality of objects is increased or decreased in proportion to the inclination angle. Thus, when a user wants to increase a speed or acceleration at which a plurality of objects will be scrolled, the user may further incline the mobile device. On the contrary, if the user wants to decrease a speed or acceleration at which a plurality of objects will be scrolled, the user may incline the mobile device less. Therefore, exemplary embodiments of the present invention provide a function of detecting an inclined direction and inclination angle of a mobile device and increasing or decreasing a scrolling speed or acceleration for a plurality of objects in proportion to the inclination angle.

Figure 21:
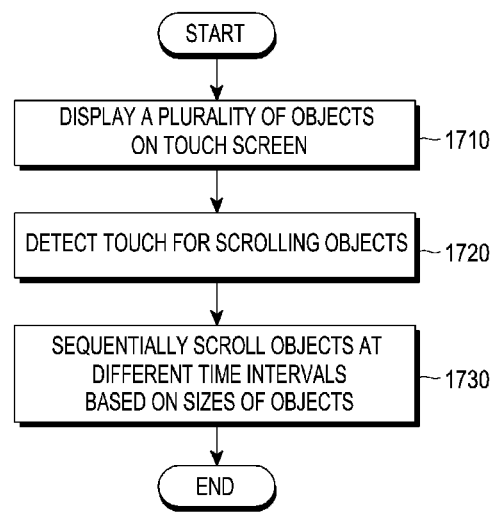
FIG. 21 is a flowchart illustrating a method for controlling a mobile device having a parallax scrolling function according to an exemplary embodiment of the present invention.

FIG. 21 is a flowchart illustrating a method for controlling a mobile device having a parallax scrolling function according to an exemplary embodiment of the present invention, and FIGS. 22A to 23E illustrate parallax scrolling functions of sequentially scrolling a plurality of objects at different time intervals based on the sizes of the objects according to an exemplary embodiment of the present invention.

Referring to FIG. 21, a plurality of objects are displayed on the touch screen of the mobile device in step 1710. That is, the controller 110 of the mobile device 100 may control display of the plurality of objects on the touch screen 190. The objects may be one of icons, widgets, content, and the like for example. The icons may be shortcut icons for executing a shortcut function, icons for executing applications, or task icons for executing preset functions.

Referring to FIG. 22A, the controller 110 of the mobile device 100 displays the plurality of objects A1 to A6 on the touch screen 190. The screen of FIG. 22A on which the objects A1 to A6 are displayed is referred to as a first screen. The objects A1 to A6 may be one of icons, widgets, and content, for example.

Subsequently, the controller 110 detects a touch for scrolling the plurality of objects on the touch screen 190 in step 1720. The controller 110 of the mobile device 100 may detect a touch on the touch screen 190. More specifically, the controller 110 may detect a touch for scrolling the plurality of objects on the touch screen 190. The touch may be, for example, a drag or flick. Thus, the controller 110 may detect, for example, a drag or flick for scrolling the plurality of objects. Referring to FIGS. 22A to 22E again, the controller 110 may detect a touch 1802 of a user 1800 for scrolling the plurality of objects A1 to A6 on the touch screen 190 in FIG. 22A. The touch 1802 may be a drag or flick. For example, the touch 1802 may be a leftward drag or flick as illustrated in FIG. 22A. The user's leftward drag or flick may mean that the user intends to scroll the first screen to the left. That is, if the user is to scroll the first screen to the left, the user may drag or flick the touch screen to the left. A screen that displays the plurality of objects B1 to B6 in FIG. 22E will be referred to as a second screen. The second screen is to the right of the first screen, hidden from the touch screen 190. If the user wants to scroll from the first screen to the second screen, the user may drag or flick the touch screen to the left.

The controller 110 scrolls the plurality of objects sequentially at different time intervals in order of the sizes of the objects in step 1730. The sizes of the objects may be areas occupied by the objects on the touch screen or file sizes of the objects. For example, the controller 110 may sequentially scroll the plurality of objects at different time intervals in order of the displayed areas of the objects on the touch screen 190 in step 1730. That is, the controller 110 may sequentially scroll the plurality of objects at different time intervals in an ascending or descending order of the displayed areas of the objects on the touch screen 190. Referring to FIGS. 22A to 22E again, the controller 110 may detect the touch 1802 for scrolling the objects A1 to A6 in FIG. 22A. The touch 1802 may be a leftward drag or flick as illustrated in FIG. 22A. The controller 110 may then scroll the plurality of objects sequentially at different time intervals in an ascending order of the displayed areas of the objects. For example, the controller 110 may scroll the objects B1 to B4 sequentially at different time intervals in an ascending order of the displayed areas of the objects B1 to B4, as illustrated in FIG. 22B. Therefore, the object B1 occupying the smallest area on the touch screen is first scrolled as illustrated in FIG. 22B, followed by the object B2 occupying the second-smallest area on the touch screen and the object B3 occupying the third-smallest area on the touch screen as illustrated in FIG. 22C. The scrolling of the object B1 is completed, followed by the scrolling of the object B2 as illustrated in FIG. 22D and then by the scrolling of the object B3 as illustrated in FIG. 22E. The object B4 is also scrolled sequentially at a different time interval according to its displayed area on the touch screen.

In another example, the controller 110 may sequentially scroll the plurality of objects at different time intervals according to the file sizes of the objects. That is, the controller 110 may sequentially scroll the plurality of objects at different time intervals in an ascending or descending order of the file sizes of the objects in response to the touch detected in step 1720.

Referring to FIGS. 23A to 23E, the controller 110 may detect a touch 1902 of a user 1900 for scrolling the objects A1 to A6 in FIG. 23A. The touch 1902 may be a leftward drag or flick as illustrated in FIG. 23A. The controller 110 may then scroll the plurality of objects sequentially at different time intervals in order of the file sizes of the objects. For example, the controller 110 may scroll a plurality of objects B1, W1 and V1 sequentially at different time intervals in an ascending order of the file sizes of the objects B1, W1 and V1, as illustrated in FIG. 23B. Therefore, the object B1 (e.g., Text) having the smallest file size is first scrolled as illustrated in FIG. 23B, followed by the object W1 (e.g., Widget) having the second smallest file size and the object V1 (e.g., Video) having the third smallest file size as illustrated in FIG. 23C. The scrolling of the object B1 is completed, followed by the scrolling of the object W1 as illustrated in FIG. 23D and then by the scrolling of the object V1 as illustrated in FIG. 23E.

In this manner, exemplary embodiments of the present invention provide a parallax scrolling function of sequentially scrolling a plurality of objects at different time intervals according to the sizes of the objects (e.g., the areas occupied by the objects on the touch screen as illustrated in FIGS. 22A to 22E or the file sizes of the objects as illustrated in FIGS. 23A to 23E. Therefore, a user can readily identify the sizes of the objects from the scrolled order of the objects. That is, since the plurality of objects are scrolled sequentially at different time intervals according to their sizes in the exemplary embodiment of the present invention, the user can readily identify the sizes of the objects.

FIGS. 24A to 24F illustrate parallax scrolling functions of sequentially scrolling a plurality of objects at different time intervals based on time information assigned to the objects according to another exemplary embodiment of the present invention.

Figure 24C:
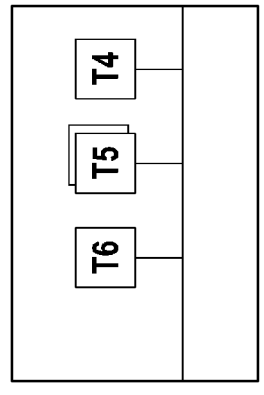
FIGS. 24A to 24F illustrate parallax scrolling functions of sequentially scrolling a plurality of objects at different time intervals based on times assigned to the objects according to an exemplary embodiment of the present invention.
Figure 24F:
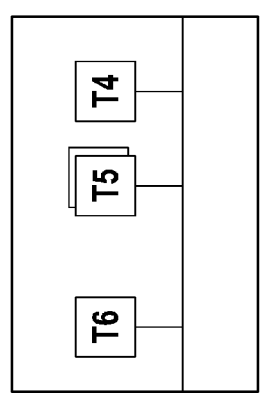
Figure 24B:
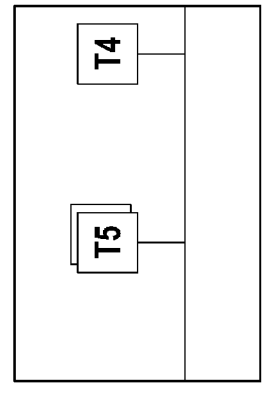
Figure 24E:
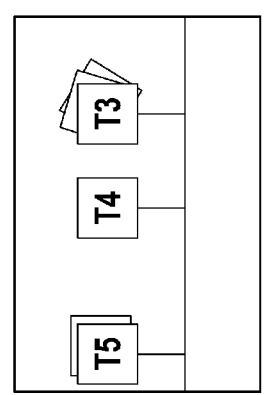
Figure 24A:
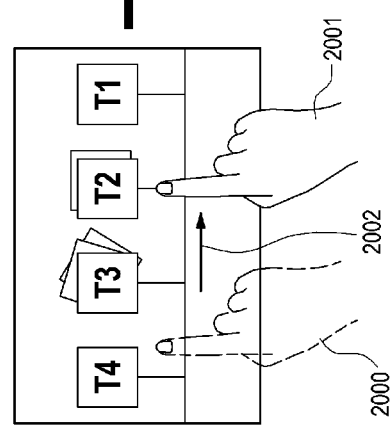

In accordance with the method for controlling a mobile device having a parallax scrolling function according to another exemplary embodiment of the present invention, a plurality of objects are displayed on the touch screen of the mobile device. That is, the controller 110 of the mobile device may control display of a plurality of objects on the touch screen 190 of the mobile device 100. The objects may be at least one image. Referring to FIG. 24A, the controller 110 of the mobile device 100 displays a plurality of objects T1 to T4 on the touch screen 190. The screen illustrated in FIG. 24A on which the plurality of objects T1 to T4 are displayed will be referred to as a first screen. The objects T1 to T4 may be at least one image, for example.

Subsequently, the controller 110 detects a touch for scrolling the plurality of objects on the touch screen 190. The controller 110 of the mobile device 100 may detect a touch on the touch screen 190. More specifically, the controller 110 may detect a touch for scrolling the plurality of objects on the touch screen 190. The touch may be, for example, a drag or flick. Thus, the controller 110 may detect, for example, a drag or flick for scrolling the plurality of objects. Referring to FIGS. 24A to 24F again, the controller 110 may detect a touch 2002 of a user 2000 for scrolling the plurality of objects T1 to T4 on the touch screen 190 in FIG. 24A. The touch 2002 may be a drag or flick. For example, the touch 2002 may be a rightward drag or flick as illustrated in FIG. 24A. The user's rightward drag or flick may mean that the user intends to scroll the first screen to the right. That is, if the user is to scroll the first screen to the right, the user may drag or flick the touch screen to the right. A screen that displays a plurality of objects T4 to T6 in FIG. 24F will be referred to as a second screen. The second screen is to the left of the first screen, hidden from the touch screen 190. If the user wants to scroll from the first screen to the second screen, the user may drag or flick the touch screen to the right.

Figure 24D:
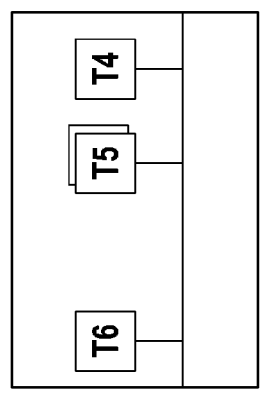

The controller 110 scrolls the plurality of objects sequentially at different time intervals according to time information about the objects. That is, the controller 110 may sequentially scroll the plurality of objects at different time intervals according to the time information about the objects in response to the detected touch. Referring to FIGS. 24A to 24F again, the controller 110 may detect the touch 2002 for scrolling the plurality of objects T1 to T4 on the touch screen 190 in FIG. 24A. The touch 2002 may be a rightward drag or flick to user position 2001 as illustrated in FIG. 24A. The controller 110 may scroll the plurality of objects sequentially at different time intervals according to the time information about the objects. For example, the controller 110 may sequentially scroll the plurality of objects T1 to T6 at different time intervals according to the time information about the objects, as illustrated in FIGS. 24B to 24F. The earliest object T4 is first scrolled as illustrated in FIG. 24B, followed by the second-earliest object T5 and the third-earliest object T6 as illustrated in FIGS. 24C and 24D. The scrolling is completed in the order of T4, T5, and T6 as illustrated in FIGS. 24C, 24D and 24F.

The exemplary embodiment of the present invention advantageously provides the parallax scrolling function of sequentially scrolling a plurality of objects at different time intervals according to time information about the objects. Therefore, the user can readily identify the time information about the objects from the scrolled order of the objects. That is, since the plurality of objects are scrolled sequentially at different time intervals according to their time information, the user can readily identify the time information about the objects.

FIGS. 25A to 25E illustrate parallax scrolling functions of sequentially scrolling a plurality of objects at different time intervals based on the on-map positions of the objects according to another exemplary embodiment of the present invention.

In accordance with the method for controlling a mobile device having a parallax scrolling function according to another exemplary embodiment of the present invention, a plurality of objects are displayed on the touch screen of the mobile device. That is, the controller 110 of the mobile device may control display of a plurality of objects on the touch screen 190 of the mobile device 100. The objects may be of at least one content, for example. Referring to FIG. 25A, the controller 110 of the mobile device 100 is executing a map application. The controller 110 may display a map screen on the touch screen 190 according to the execution of the map application. Referring to FIG. 25B, the controller 110 of the mobile device 100 displays an object S1 on the touch screen 190. The object S1 may be search content related to a predetermined point on a map. That is, the object may be content being a search result received from a search server or an Internet search site regarding the predetermined point of the map. For example, the predetermined point of the map may be the location of the Eiffel Tower in Paris. The point may be predetermined by user selection or by the controller 110. The object being the detected content related to the predetermined point of the map may be search information related to the location of the Eiffel Tower in Paris. For example, the object may be information about a restaurant, a service area, or a tourist information center in the vicinity of the Eiffel Tower in Paris.

Subsequently, the controller 110 detects a touch for scrolling the plurality of objects on the touch screen 190. The controller 110 of the mobile device 100 may detect a touch on the touch screen 190. More specifically, the controller 110 may detect a touch for scrolling the plurality of objects on the touch screen 190. The touch may be, for example, at least one tap, drag or flick. Thus, the controller 110 may detect, for example, a tap, drag or flick for scrolling the plurality of objects. Referring to FIGS. 25A to 25E again, the controller 110 may detect a touch for scrolling a plurality of objects S1, S2 and S3 on the touch screen 190 in FIG. 25A. The touch may be two successive taps in FIG. 25A. The user's two successive taps may mean that the user intends to scroll the plurality of objects being search content. That is, if the user is to scroll the plurality of objects S1, S2 and S3 being search content, the user may tap twice the touch screen.

The controller 110 scrolls the plurality of objects sequentially at different time intervals according to position information about the objects on the map. That is, the controller 110 may sequentially scroll the plurality of objects at different time intervals according to the position information about the objects on the map in response to the detected touch. For example, the position information about the objects on the map may be information about the distances between the objects and the predetermined point of the map. The position information about the objects on the map may be information about the distances between the objects and the object S1 being restaurant information at the location of the Eiffel Tower corresponding to the predetermined point of the map. For example, the controller 110 may sequentially scroll the objects S1, S2 and S3 at different time intervals according to their on-map position information, as illustrated in FIGS. 25B to 25E. For example, the object S1 may be information about a restaurant in the vicinity of the Eiffel Tower. The object S2 may be information about a service area in the vicinity of the Eiffel Tower and the object S3 may be information about a tourist information center in the vicinity of the Eiffel Tower. The objects S1, S2 and S3 are nearer to the location of the Eiffel Tower in the order of S1, S2 and S3. Therefore, the nearest object S1 is first scrolled as illustrated in FIG. 25B, followed by the second-nearest object S2 as illustrated in FIG. 25C and then the third-nearest object S3 as illustrated in FIG. 25D. The scrolling is completed earlier in the order of S1, S2 and S3 as illustrated in FIGS. 25C, 25D and 25E.

The exemplary embodiment of the present invention advantageously provides the parallax scrolling function of sequentially scrolling a plurality of objects at different time intervals according to on-map position information about the objects. Therefore, the user can readily identify the on-map position information about the objects from the scrolled order of the objects. That is, since the plurality of objects are scrolled sequentially at different time intervals according to their on-map position information, the user can readily identify the position information about the objects.

FIGS. 26A to 26F illustrate parallax scrolling functions of sequentially scrolling a plurality of objects at different time intervals based on search accuracy information about the objects according to another exemplary embodiment of the present invention.

Referring to FIGS. 26A to 26F, a plurality of objects are displayed on the touch screen of the mobile device. That is, the controller 110 of the mobile device may control display of a plurality of objects on the touch screen 190 of the mobile device 100. The objects may be at least one content, for example. Referring to FIG. 26A, the controller 110 of the mobile device 100 is executing a search application. The controller 110 may display a search screen on the touch screen 190 according to the execution of the search application. Referring to FIG. 26B, the controller 110 of the mobile device 100 displays an object S1 on the touch screen 190. The object S1 may be search content related to a search keyword. The search keyword may be OASIS as illustrated in FIG. 26A. The object being the search content related to the search keyword may be search information related to OASIS, for example.

Subsequently, the controller 110 detects a touch for scrolling the plurality of objects on the touch screen 190. The controller 110 of the mobile device 100 may detect a touch on the touch screen 190. More specifically, the controller 110 may detect a touch for scrolling a plurality of objects on the touch screen 190. The touch may be, for example, at least one of a tap, drag or flick. Thus, the controller 110 may detect, for example, a tap, drag or flick for scrolling the plurality of objects. Referring to FIGS. 26A to 26F again, the controller 110 may detect a touch for scrolling a plurality of objects S1, S2 and S3 on the touch screen 190 in FIG. 26A. The touch may be at least one tap, drag or flick. For example, the touch may be one tap on the touch screen in FIG. 26A. The user's one tap may mean that the user intends to scroll the plurality of objects being search content. That is, if the user is to scroll the plurality of objects S1, S2 and S3 being search content, the user may tap once the touch screen.

The controller 110 scrolls the plurality of objects sequentially at different time intervals according to search accuracy information about the objects. That is, the controller 110 may sequentially scroll the plurality of objects at different time intervals according to the search accuracy information about the objects in response to the detected touch. For example, the controller 110 may sequentially scroll the objects S1, S2 and S3 at different time intervals according to their search accuracy information, as illustrated in FIGS. 26B to 26F. For example, the search accuracies of the objects S1, S2 and S3 may be 98%, 51%, and 26%, respectively. Therefore, the object 51 having the highest search accuracy is first scrolled as illustrated in FIG. 26B, followed by the object S2 having the second-highest search accuracy as illustrated in FIG. 26C and then the object S3 having the third-highest search accuracy as illustrated in FIG. 26D. The scrolling is completed earlier in the order of S1, S2 and S3 as illustrated in FIGS. 26D, 26E and 26F.

The exemplary embodiment of the present invention advantageously provides the parallax scrolling function of sequentially scrolling a plurality of objects at different time intervals according to search accuracy information about the objects. Therefore, the user can readily identify the search accuracy information about the objects from the scrolled order of the objects. That is, since the plurality of objects are scrolled sequentially at different time intervals according to their search accuracy information, the user can readily identify the search accuracy of the objects.

FIGS. 27A to 27F illustrate parallax scrolling functions of sequentially scrolling a plurality of objects at different time intervals based on the use frequencies of the objects according to an exemplary embodiment of the present invention.

Figures 27A, 27B, 27C:
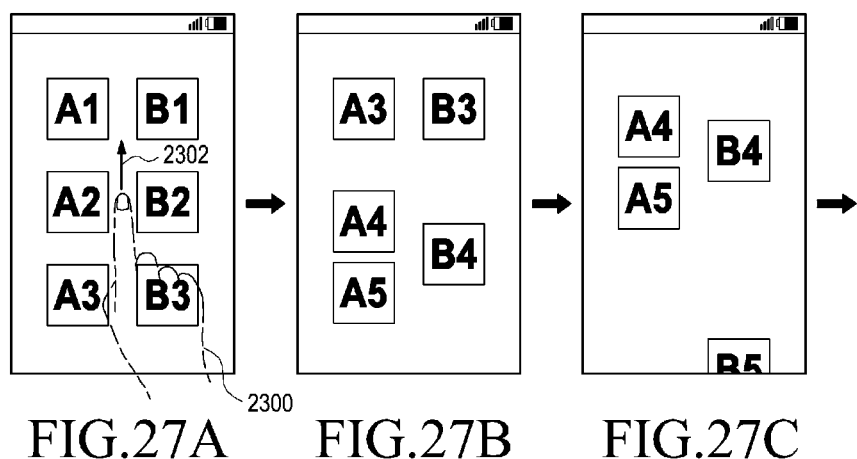
FIGS. 27A to 27F illustrate parallax scrolling functions of sequentially scrolling a plurality of objects at different time intervals based on the use frequencies of the objects according to an exemplary embodiment of the present invention.

Referring to FIGS. 27A to 27F, a plurality of objects are displayed on the touch screen of the mobile device. That is, the controller 110 of the mobile device may control display of a plurality of objects on the touch screen 190 of the mobile device 100. The objects may be at least one of icons, widgets, and content, for example. Referring to FIG. 27A, the controller 110 of the mobile device 100 displays a plurality of objects A1 to A3 and B1 to B3 on the touch screen 190. The screen of FIG. 27A on which the plurality of objects A1 to A3 and B1 to B3 are displayed is referred to as a first screen. The plurality of objects A1 to A3 and B1 to B3 may be one of icons, widgets, content, and the like for example.

Figures 27D, 27E, 27F:
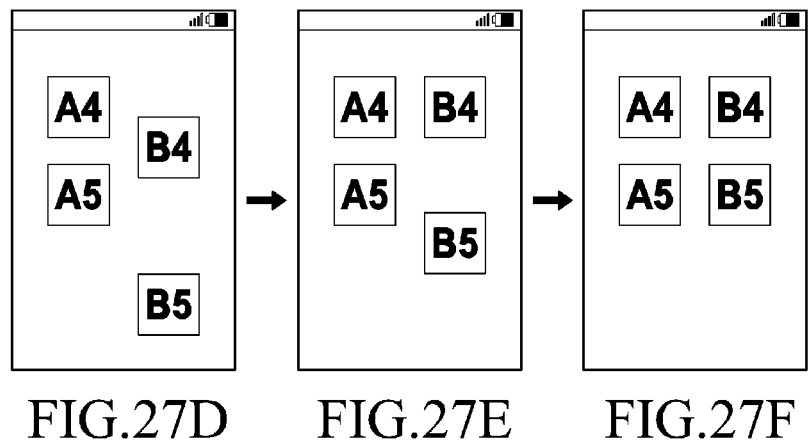

Subsequently, the controller 110 detects a touch for scrolling the plurality of objects on the touch screen 190. The controller 110 of the mobile device 100 may detect a touch on the touch screen 190. More specifically, the controller 110 may detect a touch for scrolling a plurality of objects on the touch screen 190. The touch may be, for example, a drag or flick. Thus, the controller 110 may detect, for example, a drag or flick for scrolling the plurality of objects. Referring to FIGS. 27A to 27F again, the controller 110 may detect a 2302 touch of a user 2300 for scrolling a plurality of the objects A1 to A3 and B1 to B3 on the touch screen 190 in FIG. 27A. The touch 2302 may be a drag or flick. For example, the touch 2302 may be an upward drag or flick as illustrated in FIG. 27A. The user's upward drag or flick may mean that the user intends to scroll the first screen upward. That is, if the user is to scroll the first screen upward, the user may drag or flick the touch screen upward. A screen on which a plurality of objects A4, A5, B4 and B5 are displayed in FIG. 27F is referred to as a second screen. The second screen is to the left of the first screen, hidden from the touch screen 190. When the user scrolls from the first screen to the second screen, the user may drag or flick the touch screen upward.

The controller 110 scrolls the plurality of objects sequentially at different time intervals according to the use frequencies of the objects. That is, the controller 110 may sequentially scroll the plurality of objects at different time intervals according to the use frequencies of the objects in response to the detected touch (use frequency information may be prestored and updated in the memory). For example, the controller 110 may sequentially scroll the objects A1 to A3 and B1 to B3 at different time intervals according to their use frequencies, as illustrated in FIGS. 27B to 27F. For example, if the object A5 is used most frequently among the objects A4, A5, B4 and B5 displayed on the second screen, followed by the objects A4, B4 and B5 in this order, the most frequently used object A5 is first scrolled as illustrated in FIG. 27B, followed by the objects A4, B4 and B5 in this order. Therefore, the scrolling is completed earlier in the order of A5, A4, B4 and B5 as illustrated in FIGS. 27C to 27F.

The exemplary embodiment of the present invention advantageously provides the parallax scrolling function of sequentially scrolling a plurality of objects at different time intervals according to the use frequencies of the objects. Therefore, the user can readily identify the use frequencies of the objects from the scrolled order of the objects. That is, since the plurality of objects are scrolled sequentially at different time intervals according to their use frequencies, the user can readily identify the use frequencies of the objects.

As is apparent from the above description of the present invention, an exemplary embodiment of the present invention provides a parallax scrolling function of sequentially scrolling a plurality of objects at different time intervals according to the attributes of the objects.

Another exemplary embodiment of the present invention provides a parallax scrolling function of sequentially scrolling a plurality of objects at different time intervals in order of proximity of the objects to the position of a detected touch.

Another exemplary embodiment of the present invention provides a parallax scrolling function of detecting an inclined direction and/or inclination angle of a mobile device through a sensor module and sequentially scrolling a plurality of objects at different time intervals according to the inclined direction and/or inclination angle of the mobile device.

Another exemplary embodiment of the present invention provides a parallax scrolling function of sequentially scrolling a plurality of objects at different time intervals in order of the sizes of the objects.

A further exemplary embodiment of the present invention provides a parallax scrolling function of sequentially scrolling a plurality of objects at different time intervals according to one of the positions of the objects on a touch screen, proximity of the objects to the position of a detected touch, and the sizes, time information, on-map position information, search accuracy information, use frequencies, colors, shapes of the objects, and the like.

It will be understood that exemplary embodiments of the present invention can be implemented in hardware, software, or a combination thereof. The software may be stored in a volatile or non-volatile memory device like a ROM irrespective of whether data is deletable or rewritable, in a memory like a RAM, a memory chip, a device, or an integrated circuit, or in a storage medium to which data can be recorded optically or magnetically and from which data can be read by a machine (e.g., a computer), such as a CD, a DVD, a magnetic disk, or a magnetic tape. Further, exemplary embodiments of the present invention can be implemented in a computer or portable terminal that has a controller and a memory, and the memory is an example of a machine-readable storage medium suitable for storing a program or programs including commands to implement exemplary embodiments of the present invention. Accordingly, the present invention includes a program having a code for implementing the apparatuses or methods defined by the claims and a storage medium readable by a machine that stores the program.

The mobile device can receive the program from a program providing device connected by cable or wirelessly and store it. The program providing device may include a program including commands to implement the exemplary embodiments of the present invention, a memory for storing information required for the exemplary embodiments of the present invention, a communication module for communicating with the mobile device by cable or wirelessly, and a controller for transmitting the program to the mobile device automatically or upon request of the mobile device.

While the invention has been shown and described with reference to certain exemplary embodiments thereof, it will be understood by those of ordinary skill in the art that various changes in form and details may be made therein without departing from the spirit and scope of the invention as defined by the following claims and their equivalents.

What is claimed is:

1. A method for controlling a mobile device having a parallax scrolling function for sequentially scrolling a plurality of objects at different time intervals according to attributes of the plurality of objects, the method comprising:
    displaying a plurality of objects on a touch screen of the mobile device, the plurality of objects including at least a first object and a second object;
    detecting a touch for scrolling the plurality of objects on the touch screen; and
    in response to the detecting of the touch, initiating scrolling of the first object at a first time based on a first attribute associated with the first object and initiating scrolling of the second object at a second time based on a second attribute associated with the second object, wherein the first time is different from the second time, and
    wherein the first attribute and the second attribute are each based on at least one of proximity of the plurality of objects to a position of the touch, file sizes of the plurality of objects, displayed sizes of the plurality of objects, an angle of the mobile device, time information, on-map position information, search accuracy information, use frequencies, colors of the plurality of objects, or shapes of the plurality of objects, and
    wherein, when the first attributes and the second attributes are each based on the proximity of the plurality of objects to the position of the touch, the method further comprises:
        identifying a first distance from the touch to a position associated with the first object and a second distance from the touch to a position associated with the second object, and
        identifying the first time for scrolling the first object based on the first distance and the second time for scrolling the second object based on the second distance.

2. The method of claim 1, wherein, when the first attribute and the second attribute are each based on the angle of the mobile device, the method further comprises:
    detecting a first angle of an orientation of the mobile device with respect to a first axis through a sensor module; and
    identifying a first speed or a first acceleration for scrolling the first object and the second object based on the first angle.

3. The method of claim 2, wherein, when the first attribute and the second attribute are each based on the angle of the mobile device, the method further comprises:
    detecting a second angle of the orientation of the mobile device with respect to a second axis through the sensor module; and
    increasing or decreasing the first speed or the first acceleration in proportion to the second angle.

4. The method of claim 1, wherein, when the first attribute and the second attribute are each based on the file sizes of the plurality of objects, the method further comprises:
    identifying the first time for scrolling the first object based on a first file size of the first object; and
    identifying the second time for scrolling the second object based on a second file size of the second object.

5. The method of claim 4, wherein, when the first attribute and the second attribute are each based on the angle of the mobile device, the method further comprises identifying a first speed or a first acceleration based on the first file size of the first object and the second file size of the second object.

6. The method of claim 5, wherein the first speed is reversely proportional to the first file size of the first object and the second file size of the second object.

7. The method of claim 5, wherein the first acceleration and is reversely proportional to the first file size of the first object and the second file size of the second object.

8. A non-transitory computer-readable medium for storing instructions that, when executed, cause at least one processor to perform the method of claim 1.

9. The method of claim 1, wherein, when the first attribute and the second attribute are each based on the displayed sizes of the plurality of objects, the method further comprises:
    identifying the first time for scrolling the first object based on a first displayed size of the first object; and
    identifying the second time or for scrolling the second object based on a second displayed size of the second object.

10. The method of claim 9, wherein, when the first attribute and the second attribute are each based on the angle of the mobile device, the method further comprises identifying a first speed or a first acceleration based on the first displayed size of the first object and the second displayed size of the second object.

11. The method of claim 10,
    wherein the first speed is reversely proportional to the first displayed size and the second displayed size, or
    wherein the first acceleration is reversely proportional to the first displayed size and the second displayed size.

12. A mobile device having a parallax scrolling function for sequentially scrolling a plurality of objects at different time intervals according to attributes of the plurality of objects, the mobile device comprising:
    a touch screen for displaying a plurality of objects, the plurality of objects including at least a first object and a second object; and
    a processor configured to:
    detect a touch for scrolling the plurality of objects on the touch screen, and
    in response to the detecting of the touch, initiate scrolling of the first object at a first time based on a first attribute associated with the first object and initiate scrolling of the second object at a second time based on a second attribute associated with the second object, wherein the first time is different from the second time, and wherein the first attribute and the second attribute are each based on at least one of proximity of the plurality of objects to a position of the touch, file sizes of the plurality of objects, displayed sizes of the plurality of objects, an angle of the mobile device, time information, on-map position information, search accuracy information, use frequencies, colors of the plurality of objects, or shapes of the plurality of objects, and wherein, when the first attributes and the second attributes are each based on the proximity of the plurality of objects to the position of the touch, the method further comprises:

identifying a first distance from the touch to a position associated with the first object and a second distance from the touch to a position associated with the second object, and identifying the first time for scrolling the first object based on the first distance and the second time for scrolling the second object based on the second distance.

13. The mobile device of claim 12, further comprising a sensor module, wherein, when the first attribute and the second attribute are each based on the angle of the mobile device, the processor is further configured to:

detect a first angle of an orientation of the mobile device with respect to a first axis using the sensor module, and identify a first speed or a first acceleration for scrolling the first object and the second object based on the first angle.

14. The mobile device of claim 13, wherein, when the first attribute and the second attribute are each based on the angle of the mobile device, the processor is further configured to:

detect a second angle of the orientation of the mobile device with respect to a second axis through the sensor module, and increase or decrease the first speed or the first acceleration in proportion to the second angle.

15. The mobile device of claim 12, wherein, when the first attribute and the second attribute are each based on the file sizes of the plurality of objects, the processor is further configured to:

identify the first time for scrolling the first object based on a first file size of the first object, and identify the second time for scrolling the second object based on a second file size of the second object.

16. The mobile device of claim 15, wherein, when the first attribute and the second attribute are each based on the angle of the mobile device, the processor is further configured to identify a first speed or a first acceleration based on the first file size of the first object and the second file size of the second object.

17. The mobile device of claim 16, wherein the first speed is reversely proportional to the first file size of the first object and the second file size of the second object.

18. The mobile device of claim 16, wherein the first acceleration is reversely proportional to the first file size of the first object and the second file size of the second object.

19. The mobile device of claim 12, wherein, when the first attribute and the second attribute are each based on the displayed sizes of the plurality of objects, the processor is further configured to:

identify the first time for scrolling the first object based on a first displayed size of the first object, and identify the second time for scrolling the second object based on a second displayed size of the second object.

20. The mobile device of claim 19, wherein, when the first attribute and the second attribute are each based on the displayed sizes of the plurality of objects, the processor is further configured to identify a first speed or a first acceleration based on the first displayed size of the first object and the second displayed size of the second object.

21. The mobile device of claim 20, wherein the first speed is reversely proportional to the first displayed size and the second displayed size, or wherein the first acceleration is reversely proportional to the first displayed size and the second displayed size.

* * * * *